United States Patent
Metellus et al.

(10) Patent No.: US 10,538,190 B1
(45) Date of Patent: Jan. 21, 2020

(54) STORAGE COMPARTMENT VEHICLES

(71) Applicant: Amazon Technologies, Inc., Seattle, WA (US)

(72) Inventors: Wicksell Metellus, Seattle, WA (US); Kristopher William Bell, Issaquah, WA (US); Julius Chen, Seattle, WA (US); Wesley Scott Lauka, Seattle, WA (US); Ryan Scott Russell, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 15/620,714

(22) Filed: Jun. 12, 2017

(51) Int. Cl.
| | |
|---|---|
| *B60P 3/025* | (2006.01) |
| *A47B 96/00* | (2006.01) |
| *G06Q 10/08* | (2012.01) |
| *B60F 5/02* | (2006.01) |
| *G08G 9/00* | (2006.01) |
| *A47B 81/00* | (2006.01) |
| *A47B 49/00* | (2006.01) |

(52) U.S. Cl.
CPC .......... *B60P 3/0257* (2013.01); *A47B 49/008* (2013.01); *A47B 81/00* (2013.01); *A47B 96/00* (2013.01); *B60F 5/02* (2013.01); *G08G 9/00* (2013.01); *G06Q 10/083* (2013.01)

(58) Field of Classification Search
CPC ..... B60P 3/0257; A47B 96/00; A47B 49/008; A47B 81/00; G08G 9/00; B60F 5/02; G06Q 10/083
See application file for complete search history.

(56) References Cited

U.S. PATENT DOCUMENTS

| | | | |
|---|---|---|---|
| 2,861,714 A * | 11/1958 | Glossop | B65D 7/045 206/522 |
| 4,865,248 A | 9/1989 | Barth | |
| 4,977,971 A * | 12/1990 | Crane, III | B25J 5/00 180/8.3 |
| 5,386,462 A | 1/1995 | Schlamp | |
| 6,344,796 B1 | 2/2002 | Ogilvie et al. | |
| 6,426,699 B1 | 7/2002 | Porter | |
| 6,690,997 B2 | 2/2004 | Rivalto | |
| 6,694,217 B2 | 2/2004 | Bloom | |
| 6,919,803 B2 | 7/2005 | Breed | |
| 6,961,711 B1 | 11/2005 | Chee | |
| 6,970,838 B1 | 11/2005 | Kamath et al. | |
| 7,129,817 B2 | 10/2006 | Yamagishi | |

(Continued)

OTHER PUBLICATIONS

Machine Translation of CN-203210364-U (Year: 2013).*

(Continued)

*Primary Examiner* — Alan D Hutchinson
(74) *Attorney, Agent, or Firm* — Athorus, PLLC

(57) ABSTRACT

The present disclosure is directed toward a storage compartment vehicle ("SCV") for use in the transport of items for delivery to one or more customers and/or retrieval of items from one or more customers. The SCV may include a plurality of storage compartments that are individually accessible, each of which can contain one or more items. The SCV may navigate to a delivery location and customers may retrieve ordered items from the storage compartments of the SCV. Likewise, customers may return items into storage compartments of the SCV.

20 Claims, 17 Drawing Sheets

(56) References Cited

U.S. PATENT DOCUMENTS

| | | |
|---|---|---|
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,600,592 B2 * | 10/2009 | Goldenberg ......... B62D 55/075 180/8.1 |
| 7,693,745 B1 | 4/2010 | Pomerantz et al. |
| 7,925,375 B2 | 4/2011 | Schininger et al. |
| 8,078,317 B2 | 12/2011 | Allinson et al. |
| 8,145,351 B2 | 3/2012 | Schininger et al. |
| 8,195,328 B2 | 6/2012 | Mallett et al. |
| 9,983,020 B2 | 5/2018 | Sakuma |
| 2001/0045449 A1 | 11/2001 | Shannon |
| 2002/0116289 A1 | 8/2002 | Yang |
| 2007/0073552 A1 | 3/2007 | Hileman |
| 2007/0150375 A1 | 6/2007 | Yang |
| 2007/0170237 A1 | 7/2007 | Neff |
| 2009/0063166 A1 | 3/2009 | Palmer |
| 2009/0106124 A1 | 4/2009 | Yang |
| 2012/0039694 A1 | 2/2012 | Suzanne |
| 2012/0109419 A1 | 5/2012 | Mercado |
| 2012/0183383 A1 * | 7/2012 | Stolkin ................ B62D 55/075 414/729 |
| 2013/0261792 A1 | 10/2013 | Gupta et al. |
| 2013/0262251 A1 | 10/2013 | Wan et al. |
| 2013/0262276 A1 | 10/2013 | Wan et al. |
| 2014/0052661 A1 | 2/2014 | Shakes et al. |
| 2014/0180914 A1 | 6/2014 | Abhyanker |
| 2015/0006005 A1 | 1/2015 | Yu et al. |
| 2015/0227882 A1 | 8/2015 | Bhatt |

OTHER PUBLICATIONS

Anonymous: "Autonomous car—Wikipedia", May 10, 2016, XP055386528, Retrieved from the Internet: URL:https://en.wikipedia.org/w/index.php?title=Autonomous_car&oldid=719591145 [retrieved on Jun. 29, 2017].

Brian Coltin, Manuela Veloso, Online Pickup and Delivery Planning with Transfers for Mobile Robots, 2013, Association for the Advancement of Artificial Intelligence (Year: 2013).

Michel Gendreau, Francois Guertin, Jean-Yves Potvin, Rene Seguin ; Neighborhood search heuristics for a dynamic vehicle dispatching problem with pick-ups and deliveries, 2006, Science Direct (Year: 2006).

* cited by examiner

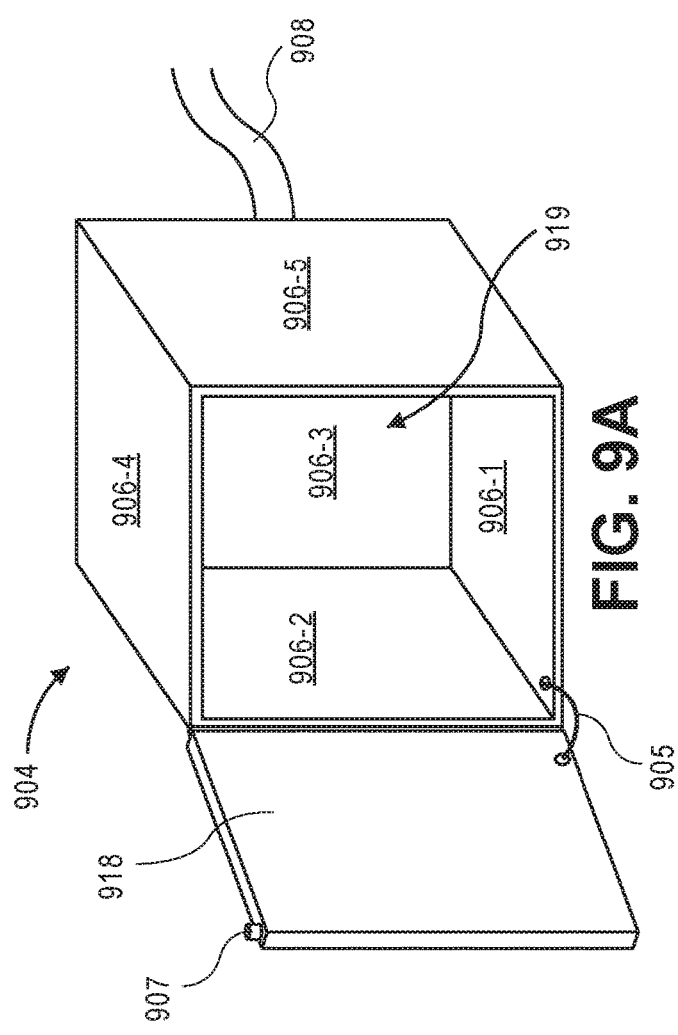
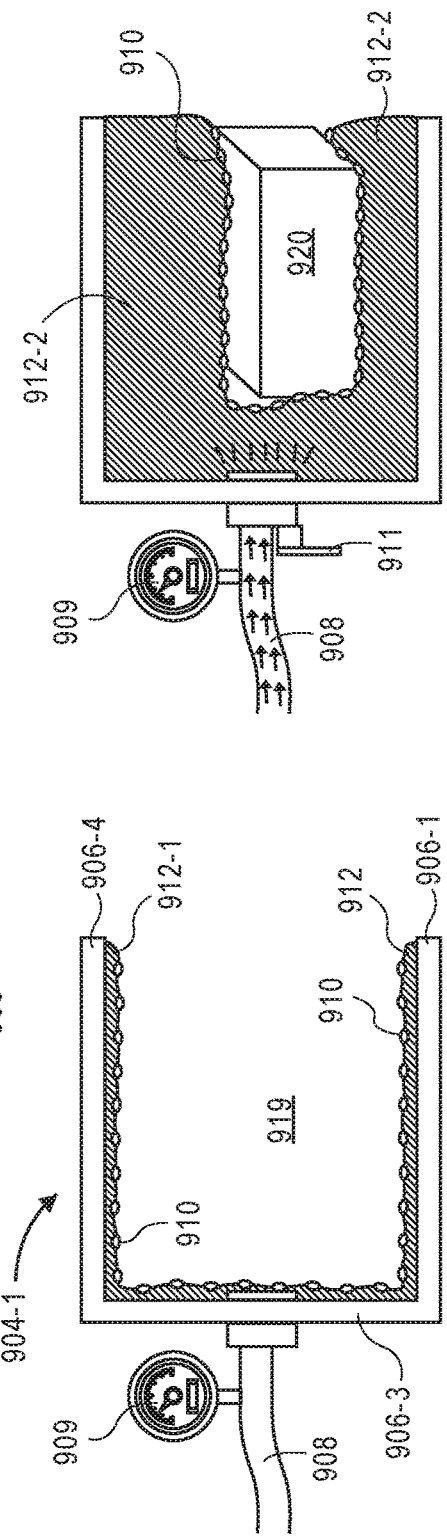

STORAGE COMPARTMENT VEHICLES

BACKGROUND

Many companies, including "big box" retail and mail-order companies, package items (e.g., books, CDs, apparel, food, etc.) and/or groups of items together to be shipped in fulfillment of requests from customers (e.g., internal or external, retail or wholesale customers). Retailers, wholesalers, and other product distributors (which may collectively be referred to as distributors) typically maintain an inventory of various items that may be ordered by customers. This inventory may be maintained and processed at a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Ordered items are typically packed in shipping packages (e.g., corrugated boxes) and shipped to the customer's residence or place of business. The delivery of physical items to a customer's specified location is traditionally accomplished using a delivery system including a human controlled truck, bicycle, cart, etc. For example, a customer may order an item for delivery to their home. The item may be picked by a human agent from a materials handling facility, packed and shipped to the customer for final delivery by a shipping carrier. An agent of the shipping carrier will load the item onto a truck that is driven to the final destination location and a driver, or another human companion with the driver, will retrieve the item from the truck and complete the delivery to the destination. Over time, an increasing frequency and volume of deliveries of items from e-commerce and mail-order companies has resulted in an increased need for faster and more efficient delivery methods.

BRIEF DESCRIPTION OF THE DRAWINGS

FIGS. 9A-9C illustrate different views of a storage compartment of the storage compartment component of a storage compartment vehicle, in accordance with described implementations.

DETAILED DESCRIPTION

As is set forth in greater detail below, the present disclosure is directed toward a storage compartment vehicle ("SCV") for use in the transport of items for delivery to one or more customers and/or retrieval of items from one or more customers. The SCV may include a plurality of storage compartments that are individually accessible, each of which can contain one or more items. In some implementations, a customer may order and item, for example from an electronic commerce website or marketplace, and select to retrieve the item from a storage compartment of an SCV while the SCV is positioned at a delivery location. In other implementations, a customer may arrange for a return of an item and select to return the item into a storage compartment of an SCV while the SCV is positioned at a delivery location.

A delivery location, as used herein, may be any location or area that is accessible by an SCV. For example, a delivery location may be outdoors on a sidewalk, street corner, etc. In other examples, the delivery location may be indoors, within a building, garage, office, etc. In some examples, the delivery location may be specified by the customer, while in other instances, the delivery location may be defined for the SCV and selectable by the customer. For example, a customer may select to have an SCV deliver an ordered item to the customer's personal residence. In such an example, the delivery location for that item will be the customer's residence, or a specific location at the customer's residence.

As discussed further below, the SCV may be configurable so that it can operate and/or travel in different environments. In some implementations, the SCV may be modular such that a storage compartment component, that contains the plurality of storage compartments, may be selectively engaged or disengaged from various different primary propulsion mechanisms, such as continuous tracks, wheels, pontoons, etc. When the storage compartment component is engaged with a primary propulsion mechanism, the primary propulsion mechanism is used to propel the SCV.

In some instances, the SCV may likewise be operable to adjust for different terrains. For example, when coupled with a primary propulsion mechanism, an angle, alignment, and/or inclination of the storage compartment component may be altered with respect to the primary propulsion mechanism and/or the terrain on which the SCV is operating. For example, if the SCV is operating on a terrain that has a slope, the angle of the storage compartment component may be adjusted with respect to the primary propulsion mechanism such that the storage compartment component remains vertically aligned while the primary propulsion mechanism is angled to match the slope of the terrain. In still other examples, the storage compartment component may be rotated to a horizontal or in-transit position when the SCV is in-transit, thereby reducing wind drag and improving the overall stability of the SCV.

Figure 1:
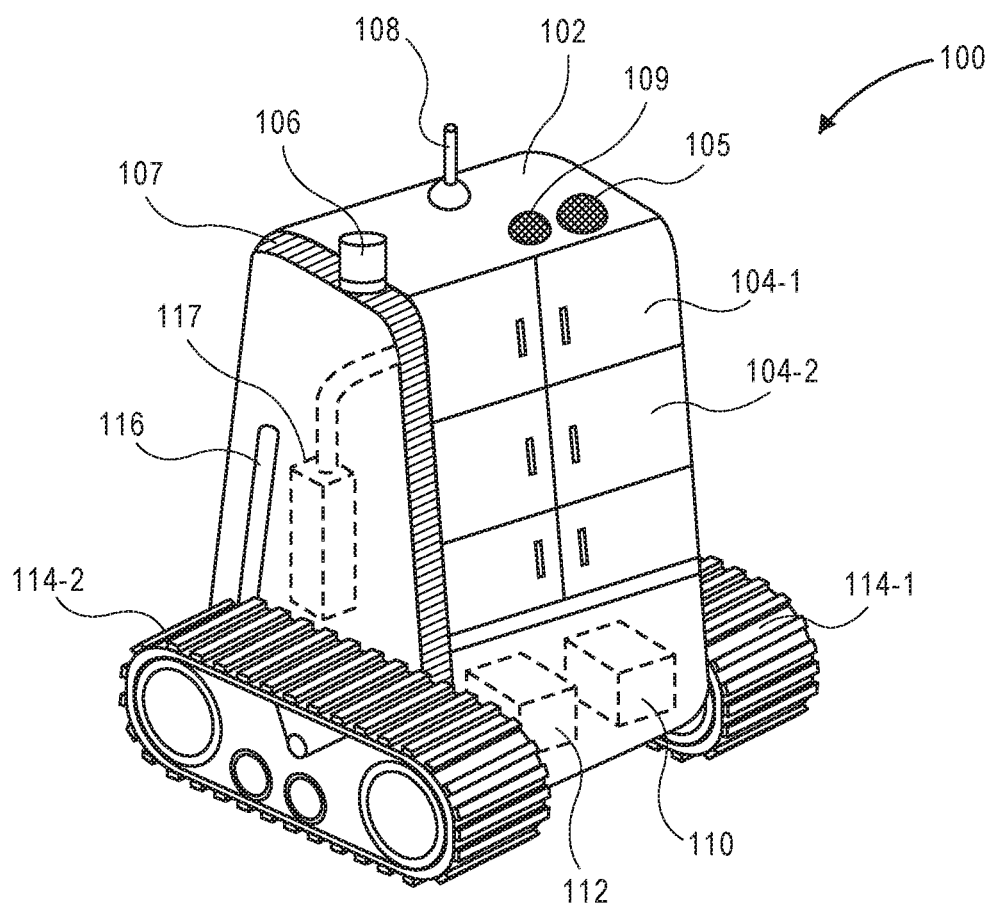
FIG. 1 is a view of a storage compartment vehicle, in accordance with described implementations.

FIG. 1 is a view of an SCV 100, in accordance with described implementations. As illustrated, the SCV includes a storage compartment component 102 that includes a plurality of storage compartments 104-1 and 104-2. As discussed further below, each storage compartment 104 may be used to store one or more items for transport and retrieval by a customer. Alternatively, or in addition thereto, the storage compartments 104 may be used to receive an item, such as a return item, from a customer. The SCV 100 may be used to transport items between a source location, such as a materials handling facility, and a delivery location.

The SCV 100 also includes primary propulsion mechanisms 114-1 and 114-2 that are used to propel the SCV along a navigation path between a source location and a delivery location. A variety of forms of primary propulsion mechanisms 114 may be utilized to propel the SCV and, as discussed further below, in some implementations the SCV 100 may be modular such that different primary propulsion mechanisms may be selectively engaged and/or disengaged from the storage compartment component 102. In the example illustrated in FIG. 1, the primary propulsion mechanisms 114-1 and 114-2 are continuous tracks. Utilization of continuous tracks as the primary propulsion mechanisms 114 provides stability for the SCV when navigating along uneven terrain and reduces the pounds-per-square inch (psi) of the SCV. In other implementations, the primary propulsion mechanism 114 may include other forms of ground based propulsion (e.g., wheels, tires), water based propulsion (e.g., propellers, pontoons), aerial propulsion (e.g., jets, turbo-jets, fans), or any combination thereof.

In still other examples, the SCV 100 may include one or more sensors, such as a camera 106 and/or a microphone 105, that receive and/or monitor the environment around the SCV 100. The camera 106 may be any form of camera, including but not limited to, a digital camera, still camera, a video camera, a stereo camera, machine vision camera, etc. The camera 106 may be used to obtain and/or process images of the environment around the SCV 100 to aid in navigation of the SCV 100, etc. In some implementations, the SCV 100 may be operable to autonomously navigate between a source location and a delivery location. In such an implementation, images obtained by the camera may be processed by a computing system local to the SCV and the processed images may be used for navigation, object detection, and/or object avoidance. Alternatively, or in addition thereto, images from the camera 106 may be transmitted by a wireless transmitter, such as an antenna 108, to the SCV monitoring service and the SCV monitoring service may process the images and provide navigation instructions to the SCV 100.

Still further, the camera may be used to enable or support customer detection and/or identification, and optionally to facilitate visual communication between the customer and one or more customer service agents at a location that is remote from the SCV 100. The SCV 100 may also include one or more audio outputs 109, such as a speaker. The audio output 109 may be used to audibly communicate with customers and/or other persons or objects within the environment around the SCV 100. Customer interaction between the SCV 100 and a customer is discussed in further detail below with respect to FIG. 2.

The SCV may also include a control system 110 and one or more power supplies 112. The control system, as discussed further below, may be used to facilitate navigation of the SCV 100, engage and disengage primary propulsion mechanisms 114, control the orientation or angle of the storage compartment component 102, detected and/or identify customers, open and close doors of storage compartments 104 of the storage compartment component, etc.

In some implementations, the SCV 100 may also include a gas compressor 117 that may be used to inflate or deflate flexible membranes within the interior of one or more storage compartments 104 to protect items located in those storage compartments during transport. Item protection mechanisms within the interior of storage compartments are discussed further below with respect to FIGS. 9A-9C.

In some implementations, the SCV may be operable to adjust the orientation or angle of the storage compartment component. For example, the storage compartment component 102 may include one or more tracks 116 that engage with a gear or other component of the primary propulsion mechanisms 114. The storage compartment component may then move by positioning the gear or other component of the primary propulsion mechanism at different locations along the track 116. As discussed further below, the angle or orientation of the storage compartment component 102 may be adjusted as the SCV 100 is navigating between a source location and a delivery location, or at any other time. For example, if the SCV 100 is traversing up or down a sloped terrain, the angle or orientation of the storage compartment component 102 may be adjusted such that the storage compartment component remains substantially vertical while the primary propulsion mechanisms travel along the slope of the terrain.

While the example illustrated in FIG. 1 depicts a track 116 on a side of the storage compartment component 102 that engages with the primary propulsion mechanism 114-2, a second track may be disposed on an opposing side of the storage compartment component 102 and engage with the primary propulsion mechanism 114-1. Likewise, while the described example includes a gear and track that work to adjust the angle or orientation of the storage compartment component 102, in other implementations other mechanisms may be utilized to adjust the angle or orientation of the storage compartment component. For example, one or more pistons may be utilized to adjust the angle or orientation of the storage compartment component. Alternatively, or in addition thereto, the angle of the storage compartment component may be hydraulically controlled.

The SCV 100 may also include a camera track 107 to enable repositioning of the camera 106. As discussed further below, in some implementations, the angle or orientation of the storage compartment component 102 may be adjusted with respect to the terrain on which the SCV is operating and/or with respect to the primary propulsion mechanism 114. When the storage compartment component 102 is adjusted, instructions may also be sent to the camera track and/or the camera that cause the camera 106 to move along the camera track 107 so that the field of view of the camera remains oriented toward a direction of travel of the SCV 100.

Figure 2:
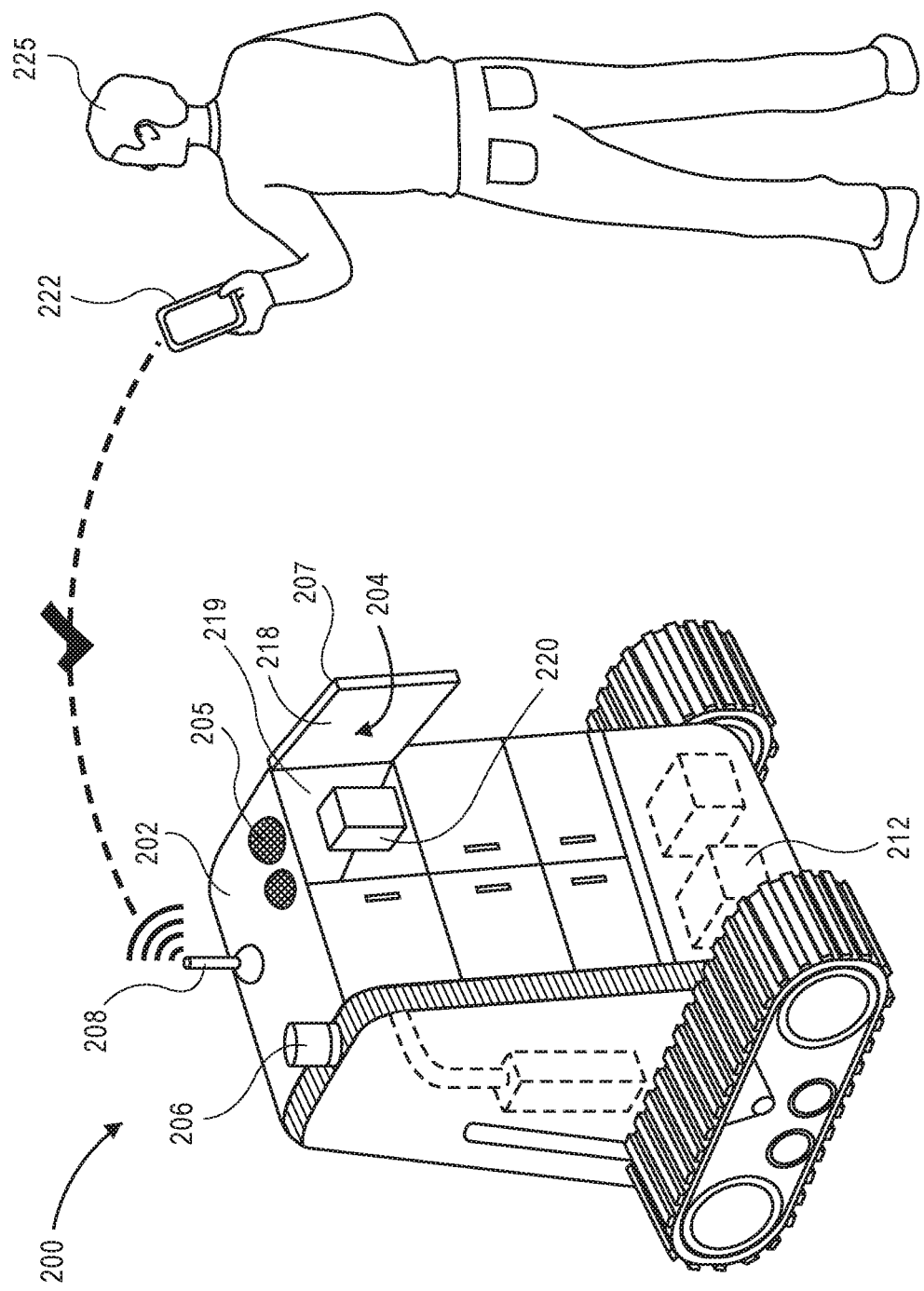
FIG. 2 is a view of a customer utilizing a mobile device to interact with a storage compartment vehicle, in accordance with described implementations.

FIG. 2 is a view of a customer 225 utilizing a mobile device 222 to interact with an SCV 200, in accordance with described implementations. In this example, the customer is utilizing an application or software program operating on the mobile device 222 to wirelessly communicate with the SCV 200 by wirelessly transmitting between an antenna of the mobile device 222 and the antenna 208 of the SCV 200. For example, the mobile device or the application operating thereon may transmit identification information, such as a unique code associated with the device 222 and/or the customer 225 to identify the customer 225 to the SCV. In this example, the customer is retrieving an item ordered from an electronic commerce website. Upon identification of the customer 225, the control system 212 of the SCV determines an appropriate storage compartment 204 of the storage compartment component 202 in which the item ordered by the customer 225 is stored. Upon determining the appropriate storage compartment, the control system 212 sends an instruction to disengage a locking mechanism 207 of the storage compartment or otherwise cause a door 218 to be opened so that the customer 225 can access an interior 219 of the storage compartment and retrieve the ordered item 220 from the storage compartment.

As another example, the customer may interact with the SCV 200, for example, using a portable device 222 to facilitate a return of an item. In one example, the customer 225 may utilize the portable device 222 to identify an item to be returned, and the SCV 200 may determine and open an empty storage compartment 204 into which the item may be placed by the customer to return the item.

In still another example, the customer may interact with the SCV 200 to retrieve one or more ordered items and to return one or more of those same items (e.g., if the item does not fit) and/or to return a different item. As one illustration, the customer may order from an electronic commerce website two pairs of shoes, each having a different size (e.g., 13 US and 13.5 US) and select the SCV 200 for item delivery. The ordered items, the shoes in this example, may be stored in one or more storage compartments of the SCV and made available to the customer at a delivery location. The customer, upon arriving at the delivery location and being identified may retrieve the ordered items, try the ordered items on to determine which item the customer desires to keep, and return the other item into a storage compartment of the SCV. In such an example, the customer may identify to the SCV which item is being placed back into the storage compartment and/or the SCV 200 may scan the item that is placed back into the storage compartment to identify the item. The customer may only be charged for the one item retrieved by the customer from the SCV and the second item that was returned into the storage compartment of the SCV 200 may be routed back to a source location by the SCV and/or made available for purchase and immediate retrieval from the SCV by another customer.

As will be appreciated any number, types and/or combinations of items may be ordered by a customer for retrieval by the customer from an SCV and the customer may retrieve and return any combination of those items and only be charged a fee for items that are removed from by the SCV by the customer and not returned to a storage compartment of the SCV.

In some implementations, in addition to or as an alternative to wirelessly communicating between the portable device 222 and the SCV 200, other mechanisms may be utilized to determine the customer. For example, the portable device may be used to present a visual identifier (e.g., bar code, QR code, bokode) that is scanned by the camera 206 and utilized to determine the customer 225 and/or a storage compartment 204 associated with the customer. In still other examples, the camera 206 may obtain one or more images of the customer 225 and process the images to determine an identity of the customer. For example, images of the customer 225 obtained by the camera 206 may be processed using one or more facial recognition algorithms to determine an identity of the customer 225.

Upon determining the identity of the customer, the SCV 200 may determine a storage compartment to open to enable access to the interior of the storage compartment by the customer (e.g., to retrieve an item from the storage compartment and/or to place an item into the storage compartment). In still other examples, the customer 225 may interact with the SCV 200 audibly by providing a verbal input that is received by the microphone 205 and processed to determine the customer 225. Audio processing may include, but is not limited to, processing the audio to determine a vocal signal corresponding to the customer, to detect a passphrase uttered by the customer, etc.

Customer identification, whether via wireless communication with a portable device 222, facial recognition, scanning of an identifier, or otherwise, may be performed by the control system 212 of the SCV 200 and/or by the SCV monitoring service, discussed below in communication with the SCV 200. For example, as discussed further below, the SCV 200 may transmit information via the antenna 208 to the SCV monitoring service.

Likewise, the SCV monitoring service may provide instructions to the SCV 200. For example, upon identification of a customer 225, the SCV monitoring service may indicate to the SCV 200 one or more storage compartments to be opened so that the customer can access the interior of the one or more storage compartments. In some implementations, the SCV monitoring service and/or an agent, such as a human operator, may be in wireless communication with the SCV 200 to control navigation of the SCV 200 and/or to visually and/or audibly communicate with a customer at the SCV 200. For example, a human agent that is remote from the SCV 200 may receive images from the camera 206 and control navigation of the SCV 200 between a source location and the delivery location. Likewise, while the SCV is at a delivery location, the camera may obtain and transmit to the human agent images of a customer located at the delivery location and/or establish an audio channel between the human agent and the SCV to enable bidirectional communication between the human agent and the customer 225.

In some implementations, the SCV 200 may maintain a storage compartment list indicating one or more items contained in the storage compartments, empty storage compartments, and/or orders or customers associated with each storage compartment. In such an example, when an identifier, such as a QR code or other unique identifier is received from a portable device 222 of a customer 225, the control system of the SCV 200 may query the storage compartment list to determine the appropriate storage compartment to open so that the customer can retrieve the item from the interior of the storage compartment. Similarly, if the customer is returning an item, the control system of the SCV may query the storage compartment list to determine an empty storage compartment to open to enable a customer to place the item to be returned into the interior of the empty storage compartment. Still further, if the customer is interested in purchasing an item, the SCV 200 may query the storage compartment list to identify items stored in storage compartments that are not yet allocated to a customer, and provide information to a portable device of the customer indicating items within storage compartments of the SCV 200 that are available for immediate purchase and retrieval by the customer. For example, in some implementations, the SCV 200 may maintain an inventory of high velocity items (items that are frequently purchased) and the customer may select to purchase and immediately retrieve the item from a storage compartment of the SCV 200. In such an example, upon purchase of the item by the customer 225, the SCV 200 and/or a SCV monitoring service in communication with the SCV 200 allocates a storage compartment containing the item to the customer and causes the door of the allocated storage compartment to open, thereby providing access to the item.

Figure 3:
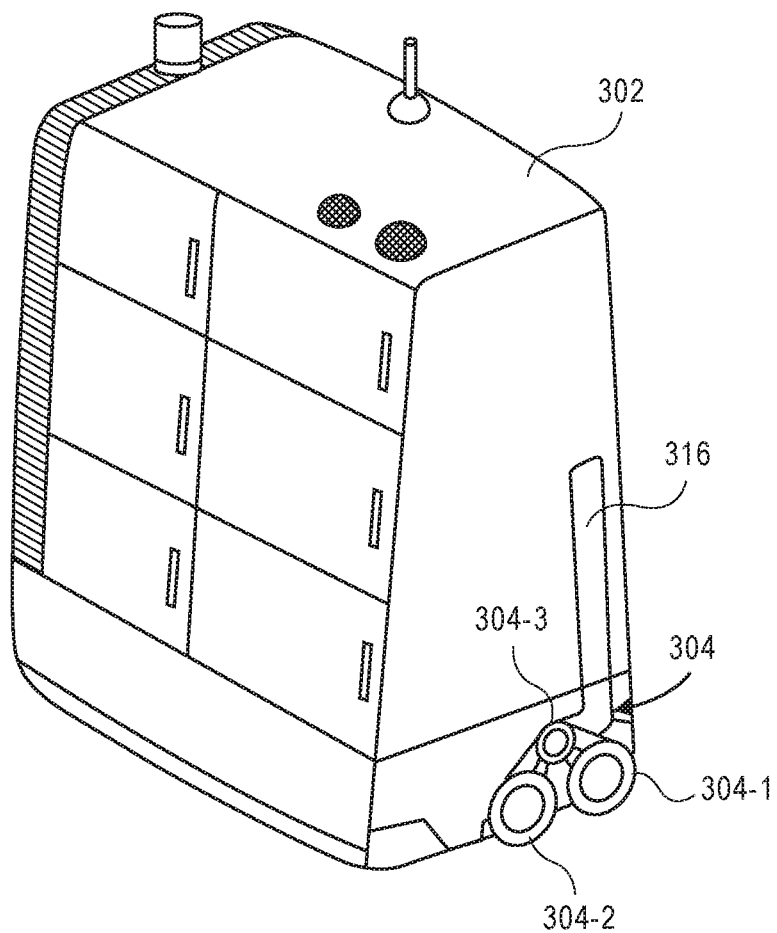
FIG. 3 is a view of a storage compartment component of a storage compartment vehicle, in accordance with described implementations.

As noted above, in some implementations, the SCV may be modular such that it can engage and disengage with different primary propulsion mechanisms. FIG. 3 is a view of a storage compartment component 302 of an SCV that has disengaged from a primary propulsion mechanism, in accordance with described implementations. When the storage compartment component 302 is disengaged from a primary propulsion mechanism, the storage compartment component may include propulsion mechanisms 304 to enable movement of the storage compartment component 302. For example, the storage compartment component may include a propulsion mechanism 304 that includes a plurality of wheels 304-1 and 304-2 that may be extended to engage with a surface and propel the storage compartment component along the surface. Such a propulsion mechanism 304 may be utilized, for example, when the storage compartment component 302 is located within a materials handling facility. For example, the propulsion mechanism 304 may be used to transport the storage compartment component 302 from a loading area (FIG. 6) at which inventory items are loaded into the storage compartments, to a primary propulsion mechanism engagement zone (FIG. 7) at which the storage compartment engages with primary propulsion mechanisms.

The propulsion mechanism 304 may also be configured to facilitate engagement between the storage compartment component 302 and a primary propulsion mechanism and to enable adjustment of the angle or orientation of the storage compartment component 302. For example, a gear 304-3 may be a double sided independent gear system. An interior side of the gear 304-3 may fit into the track 316 and be operable to adjust an angle or orientation of the storage compartment component 302 by moving the gear within the track 316. The exterior portion of the gear 304-3 may couple with the primary propulsion mechanism and be operable to provide rotational power to the primary propulsion mechanism to cause the primary propulsion mechanism to propel the SCV 300.

Figure 4A:
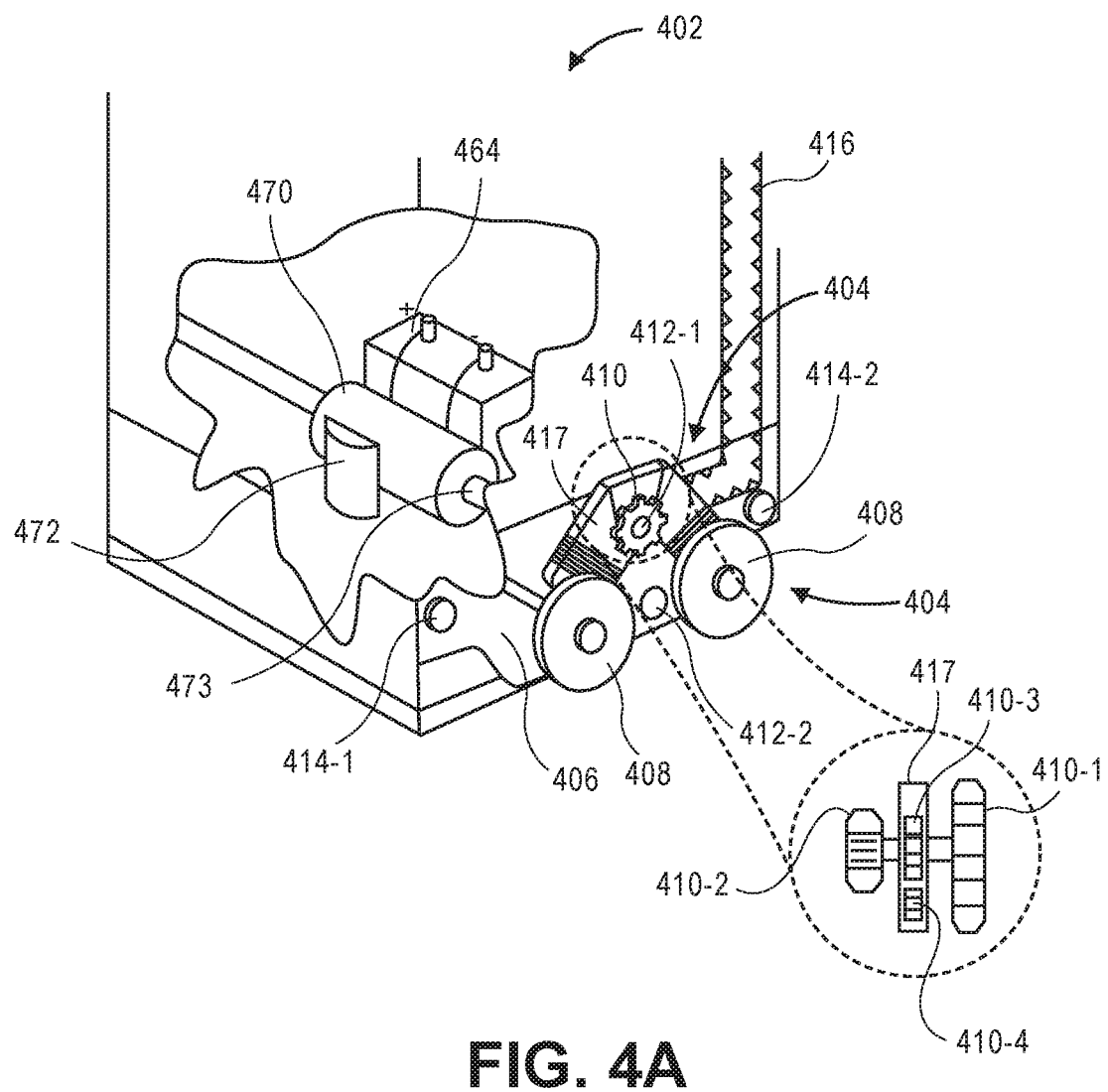
FIGS. 4A-4B illustrate additional details of a storage compartment component of a storage compartment vehicle, in accordance with described implementations.
Figure 4B:
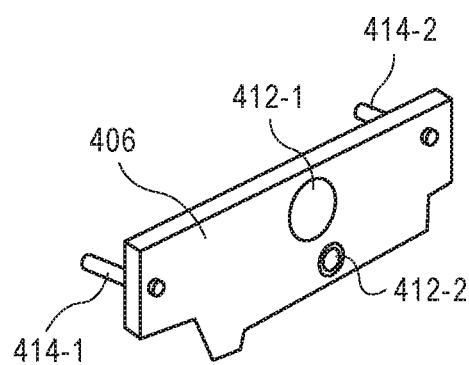

FIGS. 4A-4B illustrate additional details of a storage compartment component 402 of an SCV, in accordance with described implementations. As is shown in FIG. 4A, the storage compartment component 402 includes a motor 470, power supply 464, axle 473 and a propulsion mechanism that includes a plurality of wheels 408. In this example, the wheels 408 are driven indirectly by the axle 473 which is driven by the motor 470. For example, the axle 473 may couple with the gear assembly 404. The gear assembly 404 may be used to selectively drive the wheels 408, the gear 410-2 that fits within the track 416 and/or to drive the primary propulsion mechanism gear 410-1 that engages with primary propulsion mechanisms.

As illustrated in the expanded view, the gear assembly 404 may include an interior gear 410-2 that fits within the track 416, propulsion gears 410-3 and 410-4 that may be internal to the arms 417 and that propel the wheels 408 of the propulsion mechanism of the storage compartment component 402, and a primary propulsion mechanism gear 410-1 that may be selectively engaged to propel an engaged primary propulsion mechanism. Each of the gears 410-1, 410-2, 410-3 may be selectively engaged to control one or more aspects of the SCV. For example, the gear assembly may include a clutch that may be engaged or disengaged to activate different gears of the gear assembly 404.

The gear assembly 404 may also include an adapter plate 406 coupled to the gear assembly 404 that may be extended or retracted from the storage compartment component 402 by extended or retracting the pins or rods 414-1 and 414-2 that couple the adapter plate 406 to the storage compartment component 402. In some implementations, when the adapter plate is retracted toward the storage compartment component 402, the wheels may be rotated and extended downward and engage a surface such that the propulsion mechanism that includes the wheels 408 can propel the storage compartment component 402. In comparison, when the adapter plate 406 is extended, the wheels may adjust and retract above a bottom surface of the storage compartment component. For example, the arms 417 may rotate to extend or retract the wheels.

In addition, as illustrated in FIG. 4B, the adapter plate 406 may include receivers 412-1 and 412-2 or openings that receive rods that extend from the primary propulsion mechanisms. In FIG. 4B, the gear assembly 404 and wheels 408 have been removed to aid in explanation. In some implementations, the receiver 412-1 may be an internal opening in the gear 410 of the gear assembly such that a rod of a primary propulsion mechanism may be inserted into the receiver 412-1 and engage the storage compartment component 402 with the primary propulsion mechanism. In some implementations, the adapter plate 406 may include additional receivers, such as 412-2 to receive additional rods extending from the primary propulsion mechanisms. While the illustrated example shows two receivers 412-1 and 412-2, in other examples there may be additional or fewer receivers.

As is shown in FIG. 4A, the storage compartment component 402 may include a power supply 464 (e.g., a battery), a motor 470 (e.g., a DC electric motor operating at twelve to forty-eight volts) and a steering component 472 (e.g., one or more racks or pinions for automatically changing a direction of travel of the autonomous SCV and/or an orientation of one or more of axles 473 or the wheels 471. The motor 470 may be configured to operate at any speed or have any power rating, and to cause the SCV to travel in a forward direction of travel, a reverse direction of travel, or in any other direction of travel as determined by the steering component 472. Additionally, the axle 473 and wheels 408 may also have any dimension.

Figure 5A:
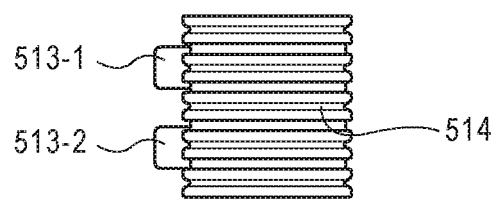
FIGS. 5A-5B illustrate additional details of a primary drive mechanism of a storage compartment vehicle, in accordance with described implementations.
Figure 5B:
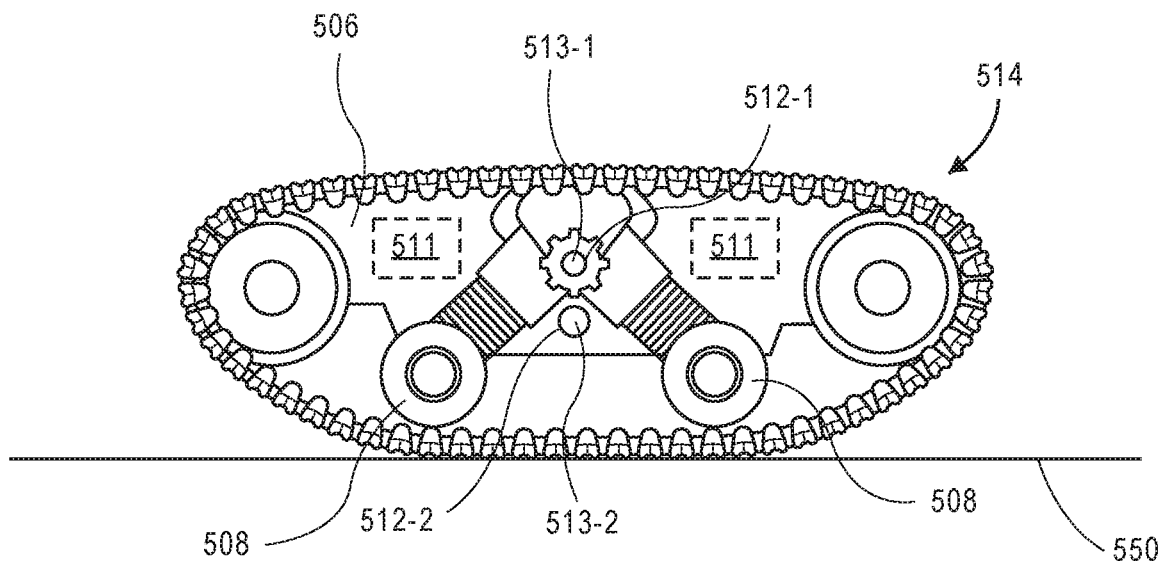

FIGS. 5A-5B illustrate additional details of a primary propulsion mechanism 514 of an SCV, in accordance with described implementations. As illustrated, the primary propulsion mechanism is disengaged from the storage compartment component. Referring first to FIG. 5A, which is a front view of a primary propulsion mechanism 514, in this example there are two rods 513-1 and 513-2 that extend from an interior of the primary propulsion mechanism and fit within the receivers 412 (FIG. 4) to engage the primary propulsion mechanism to the storage compartment component of the SCV.

FIG. 5B is a side view of the primary propulsion mechanism 514 when coupled to a storage compartment component, according to disclosed implementations. As illustrated, the rods 513-1 and 513-2 have been inserted into receivers 512-1 and 512-2 of the adapter place 506. When engaged, the wheels 508 rotate up and away from the surface 550 so that that storage compartment component is supported by the primary propulsion mechanism 514 on the surface 550.

In some implementations, the primary propulsion mechanism 514 may include additional power supplies 511 (e.g. batteries) that may be utilized by the storage compartment component when the storage compartment component is engaged with the primary propulsion mechanisms.

Figure 6:
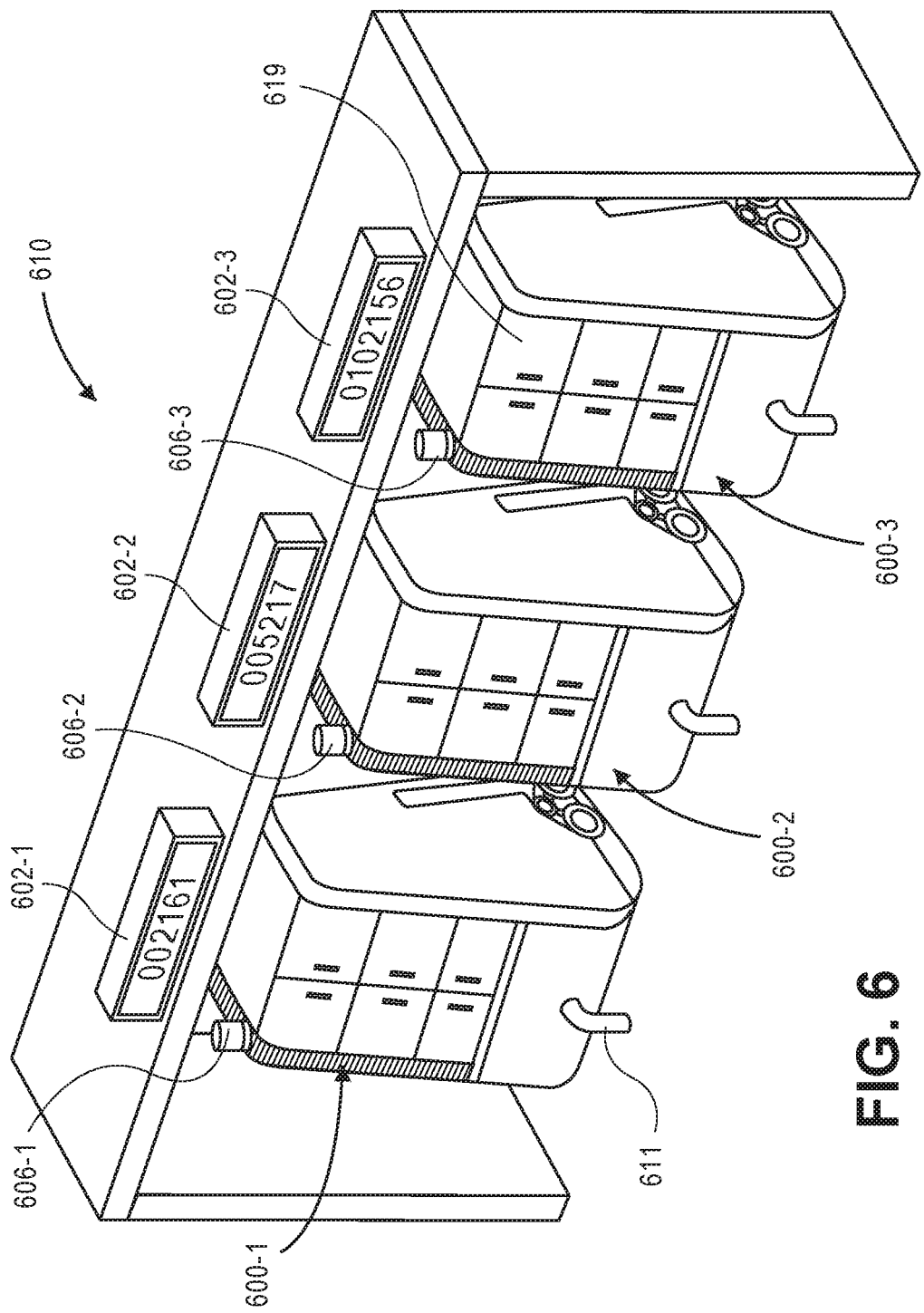
FIG. 6 is a view of a charging and inventory loading area for storage compartment vehicles, in accordance with disclosed implementations.

FIG. 6 illustrates an example SCV loading area 610, in accordance with described implementations. In some implementations, SCVs 600 may be positioned within a materials handling facility at an SCV loading area 610 where items may be loaded into the various storage compartments 619 of the SCVs. In some implementations, while the SCVs are at the SCV loading area, the power supply of the SCV 600 may be charged by coupling the SCV 600 to a charging port 611.

The SCV loading area 610 may also include identifiers 602 that identify the different SCVs 600 to facilitate inventory management and stowing by agents within the materials handling facility. For example, identifier 602-1 may uniquely identify the SCV 600-1 positioned at that location within the SCV loading area, identifier 602-2 may uniquely identify the SCV 600-2 positioned at that location within the SCV loading area, and identifier 602-3 may uniquely identify the SCV 600-3 positioned at that location within the SCV loading area. When an agent is preparing to place or stow an item into a storage compartment of the SCV, that agent may receive an indication of the identifier 602 corresponding to the SCV into which the item is to be stowed.

Upon determining an appropriate SCV based on the SCV identifier 602, the agent may approach the SCV 400 and utilize the camera 606-1, 606-2, 606-3 of the corresponding SCV to scan the item to be stowed in the SCV 600. In such an example, the SCV 600 may scan an identifier or other marker on the item and determine a storage compartment 619 into which the item is to be stowed. Upon determining the storage compartment, the SCV may open the door of the storage compartment to provide access by the agent to the interior of the storage compartment so that the agent can stow the item in the storage compartment.

As illustrated, SCVs 600-1, 600-2, and 600-3 may be placed in the SCV loading area when disengaged from primary propulsion mechanisms. In other implementations, SCVs may be positioned in the SCV loading area after they have engaged primary propulsion mechanisms.

Figure 7:
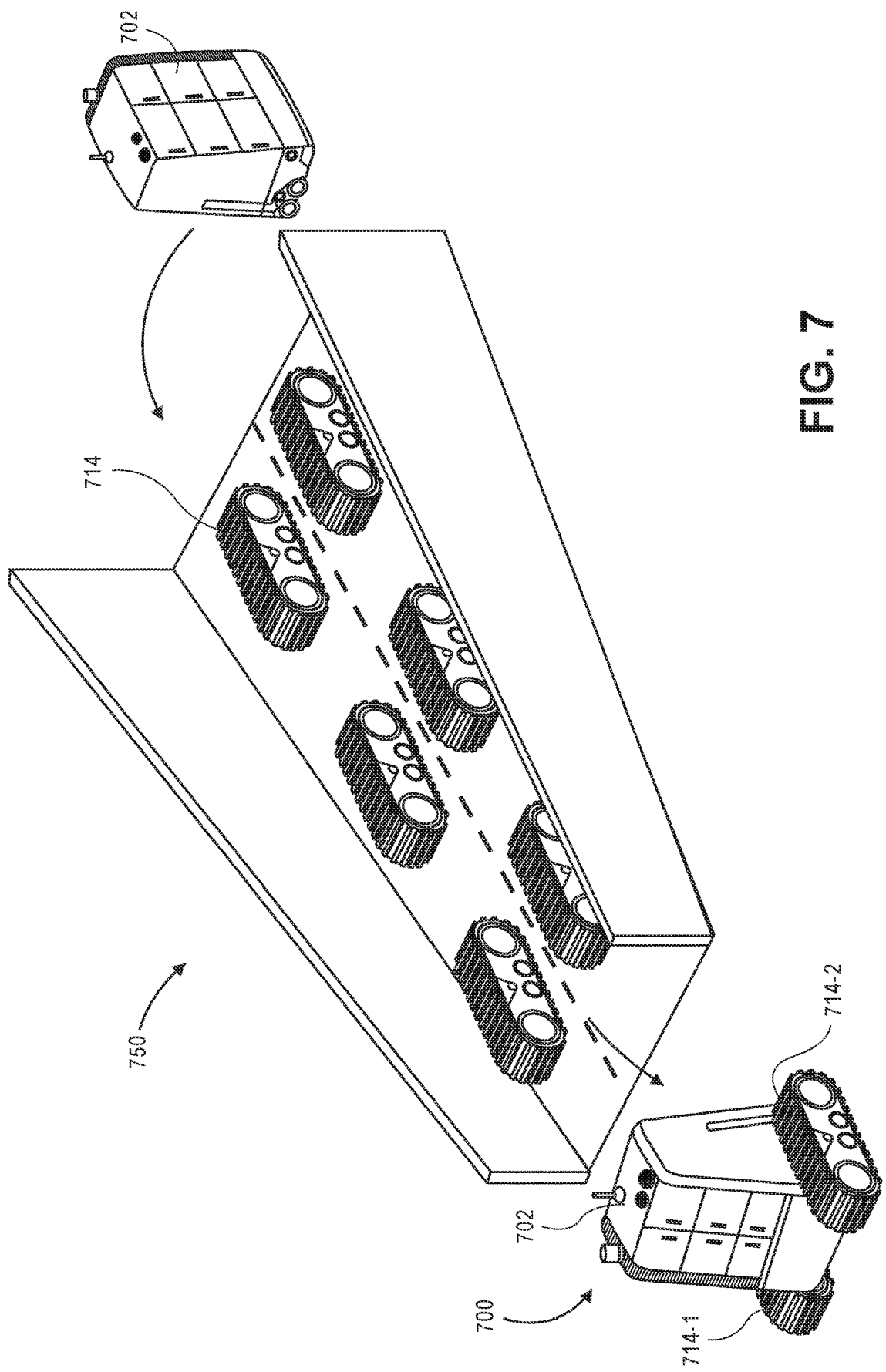
FIG. 7 illustrates a modular component engagement line for engaging a primary drive mechanism with a storage compartment component, in accordance with described implementations.

In instances when the storage compartment components are not engaged with a primary propulsion mechanism, the storage compartment components may utilize the propulsion mechanism of the storage compartment component to navigate to a primary propulsion engagement zone, as illustrated in FIG. 7. As illustrated, a storage compartment component 702 may navigate to the primary propulsion engagement zone 750 and engage with primary propulsion mechanisms 714. In some examples, the storage compartment component may extend the adapter plate, discussed above, and engage the primary propulsion mechanisms. In other examples, the primary propulsion mechanism engagement zone may be configured to move the primary propulsion mechanisms into position and to cause engagement with the storage compartment component 702. Upon engagement between the storage compartment component 702 and the primary propulsion mechanisms, such as primary propulsion mechanisms 714-1 and 714-2, the SCV 700 may depart the primary propulsion engagement zone, for example to begin navigating along a navigation path from a source location (e.g., materials handling facility) and a delivery location.

Figure 8A:
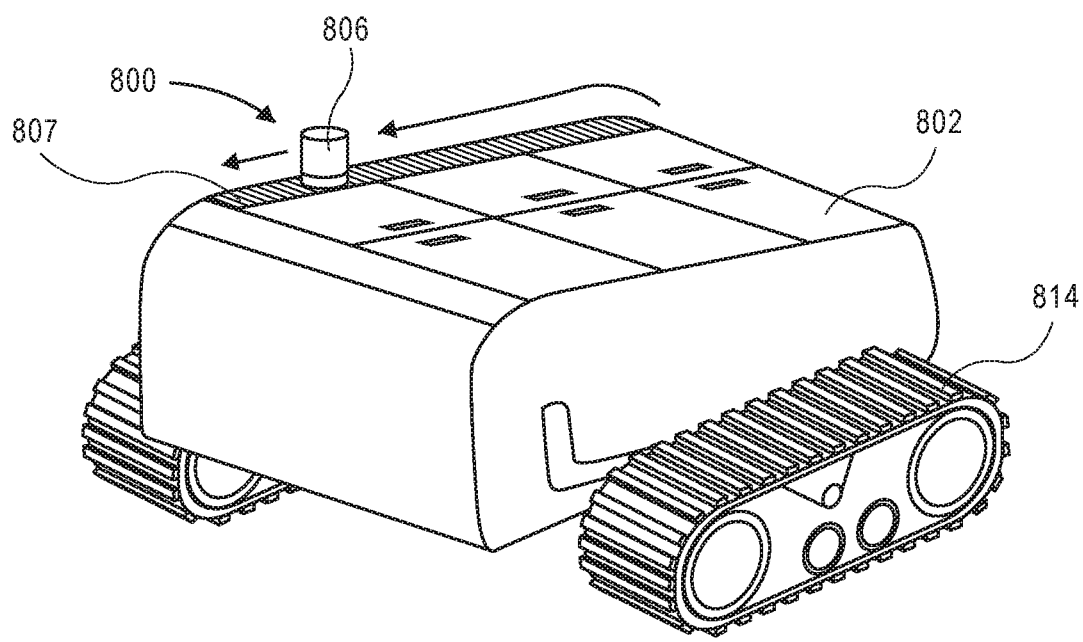
FIG. 8A illustrates a view of a module storage compartment vehicle in a horizontal configuration, in accordance with described implementations.

As discussed above, in some implementations, as the SCV navigates, the SCV may be configured to adjust the angle or orientation of the storage compartment component. Referring first to FIG. 8A, in this example, the storage compartment component is illustrated in a horizontal or "in-transit" position in which the storage compartment component is rotated approximately ninety degrees from vertical into an approximately horizontal position, as illustrated. The SCV 800 may position the storage compartment component in the horizontal orientation when, for example, the SCV is navigating at a high rate of speed and/or when the SCV is traversing steep slopes. By positioning the storage compartment component 802 in the horizontal position, the wind drag is reduced during high speed transit. Likewise, the center of gravity is lowered compared to when the storage compartment component is vertically aligned, thereby making the SCV more stable, especially on un-even or sloped terrain. When the storage compartment component 802 is in the horizontal orientation, the primary propulsion mechanisms 814 may maintain contact with the surface on which they are traveling. Likewise, the camera 806 may move along the camera track 807 so that the field of view of the camera 806 remains oriented toward the direction of travel of the SCV 800.

Figure 8B:
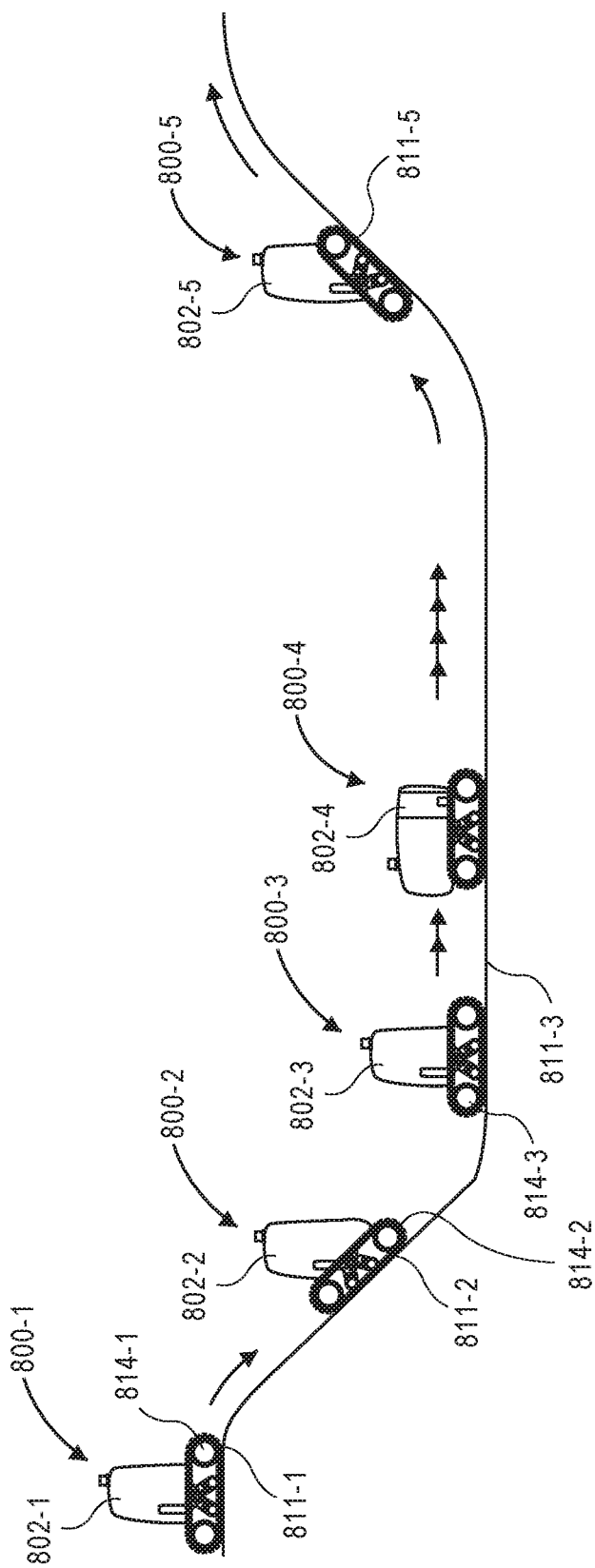
FIG. 8B illustrates a view of a module storage compartment vehicle in-transit, in accordance with described implementations.

FIG. 8B illustrates various different orientations of the SCV 800 that are determined based on the speed of the SCV and/or the slope of the terrain 811 upon which the SCV 800 is navigating, in accordance with described implementations. At a first position, the SCV 800-1 is positioned on a relatively flat surface 811-1 such that the primary propulsion mechanisms 814-1 are substantially horizontal and the storage compartment component 802-1 is vertically aligned and substantially perpendicular with respect to the surface 811-1 and the primary propulsion mechanisms 814-1. As the SCV navigates to a second position, the SCV 800-2 is traveling down a steep slope 811-2. The maintain balance, the storage compartment component 802-2 of the SCV 800-2 rotates with respect to the terrain and the primary propulsion mechanisms 814-2 such that the storage compartment component remains substantially vertically aligned. Again, as the SCV transitions to terrain 811-3 that is substantially horizontal, the storage compartment component 802-3 of the SCV 800-3 is again adjusted with respect to the primary propulsion mechanisms 814-3 such that the storage compartment component remains vertically aligned and is again approximately perpendicular with respect to the direction of travel of the primary propulsion mechanisms 814-3.

In this example, as the speed of the SCV increases, it is determined that the speed has exceeded a threshold speed and the SCV 800-4 causes the storage compartment component 802-4 to alter orientation to that of a horizontal orientation so that the center of gravity is lowered, making the SCV more stable, and to reduce wind drag during the high-speed operation, thereby conserving power. Finally, in this example, as the SCV 800-5 to navigate terrain 811-5 that has an uphill slope, the storage compartment component 802-5 is rotated back to a vertical orientation so that the SCV maintains stability as it navigates up the slope.

As will be appreciated, any angle or position of the storage compartment component may be established with the implementations discussed herein and those illustrated with respect to FIG. 8B are provided as examples only. Likewise, other forms of coupling or drives may be utilized to engaged and/or disengage the storage compartment component of the SCV with a primary propulsion mechanism and those illustrated and discussed above are provided as examples only. In some implementations, the SCV may not be modular and the storage compartment component may be permanently engaged with the primary propulsion mechanisms. In such an implementation, the propulsion mechanisms of the storage compartment component may be eliminated.

FIGS. 9A-9C illustrate different views of a storage compartment 904 of the storage compartment component of an SCV, in accordance with described implementations. Referring first to FIG. 9A, the storage compartment 904 is formed from two side surfaces 906-2, 906-5, a bottom surface 906-1 coupled between the two side surfaces, a top surface 906-4 coupled to the two side surfaces, a rear surface 906-3 coupled to each of the side surfaces, top surface and bottom surface, and a door 918 that is pivotally coupled to one of the side surfaces. The surfaces 906 may be formed of any suitable material, such as aluminum, steel, wood, etc., and form an interior 919 into which one or more items may be replaced.

The door 918 may also be formed of any suitable material (e.g., aluminum, steel, wood). In some implementations, the door 918 may be substantially opaque to provide privacy and prohibit viewing of the items stored within the interior 919 of the storage compartment. In other implementations, the door may be formed of a substantially transparent material, such as glass or plastic, so that customers can view items within the interior 919 of the storage compartment. For example, referring briefly to FIG. 10, in implementations where one or more of the storage compartments 1004 contain items that may be selected for purchase/retrieval by a customer while the customer is located at the SCV 1000, it may be desirable to utilize a substantially transparent door 1018 so that customers can view the items contained in the storage compartments without having to open the door to the storage compartment.

The door 918 may also have a locking mechanism 907, such as a pin lock, latch or other component that may be engaged or disengaged by the control system of the SCV and/or by the SCV monitoring service. When the door is in the closed position, the locking mechanism 907 may be engaged to secure the door to the top 906-4, bottom 906-1, and/or one or more sides 906-5 to prohibit access to the interior 919 of the storage compartment. In comparison, the locking mechanism may be disengaged so the door is allowed to move to the open position, as illustrated, to provide access to the interior 919 of the storage compartment. In some implementations, a door guide 905 may also be included. The door guide may be a mechanical or electrotechnical guide that is controlled by the SCV control system and/or one or more remote computing systems to autonomously move the door from the illustrated open position, to the closed position, or any other position.

In some implementations, the storage compartment may include one or more item protection components. For example, FIGS. 9B-9C illustrate side views of the storage compartment 904-1, according to described implementations. To facilitate explanation, the side surfaces 906-5, 906-2 have been removed from the illustrations of FIGS. 9B-9C. The item protection component may include a flexible membrane 912 that extends along one or more of the surfaces 906 of the interior 919 of the storage compartment and/or along the side of the door 918 that is oriented toward the interior 919 of the storage compartment when the door 918 is in the closed position.

The flexible membrane may be any form of material that can be transitioned from a retracted position 912-1, as illustrated in FIG. 9B to an expanded position 912-2, as illustrated in FIG. 9C. For example, the flexible material may be an elastic rubber material that is sealed around the perimeter of the surfaces. In such an example, the storage compartment 904 may include a gas inlet 908 that is operable to inject a gas, such as air, into the space between the flexible membrane 912 and the surfaces of the storage compartment to cause the flexible membrane to expand into the extended position 912-2, as illustrated in FIG. 9C. The inlet 908 may likewise be used to expel or remove gas and cause the flexible membrane to retract to the retracted position 912-1, illustrated in FIG. 9B. The inlet 908 may be coupled to a gas compressor of the SCV, such as the gas compressor 117 discussed above with respect to FIG. 1.

The item protection component may be used to secure an item 920 in place within the interior 919 of the storage compartment so that the item does not shift and/or become damaged during transit by the SCV and/or when the storage compartment component changes angle or orientation. In some implementations, the item protection component may also include one or more sensors 910, gauges 909, or valves 911 to monitor and/or control the amount of pressure applied to an item 920 when the flexible membrane 912 of the item protection component is expanded. For example, the sensors 910 may be touch sensors that detect when the flexible membrane 912 has expanded and come into contact with the item 920. In such a configuration, the control system of the SCV may receive signals from the sensors and determine when to terminate the inlet of gas into the flexible membrane. For example, the control system may continue to inject gas into the flexible membrane until a majority of the sensors positioned along the surface of the flexible membrane has provided a signal indicating a contact with the item.

In another example, the inlet 908 may include a pressure gauge 909 that measures the amount of gas pressure within the flexible membrane. As gas is injected into the flexible membrane and the flexible membrane expands, the pressure will begin to increase when the flexible membrane reaches limits on elasticity and/or comes into contact with the item 920. In such an example, the pressure gauge 909 may provide a signal to the control system of the SCV indicating the pressure of the gas within the flexible membrane and the control system may control the amount of gas provided into the flexible membrane based on the pressure. For example, the control system may continue to provide gas into the flexible membrane until a threshold pressure is achieved. In still another example, a pressure relief valve 911 may be included that will allow gas to be released from within the flexible membrane 912 at a defined pressure level, thereby controlling the amount of pressure applied to the item 920.

As described, the item protection component is configured to protect an item 920 positioned within the interior 919 of the storage compartment from damage that may be caused when the SCV is in-transit. By utilizing an item protection component, such as the flexible membrane, items may be placed directly into the storage compartment 904 without additional dunnage, packaging or other protection and the SCV may transport those items to delivery locations without damaging those items.

Figure 10:
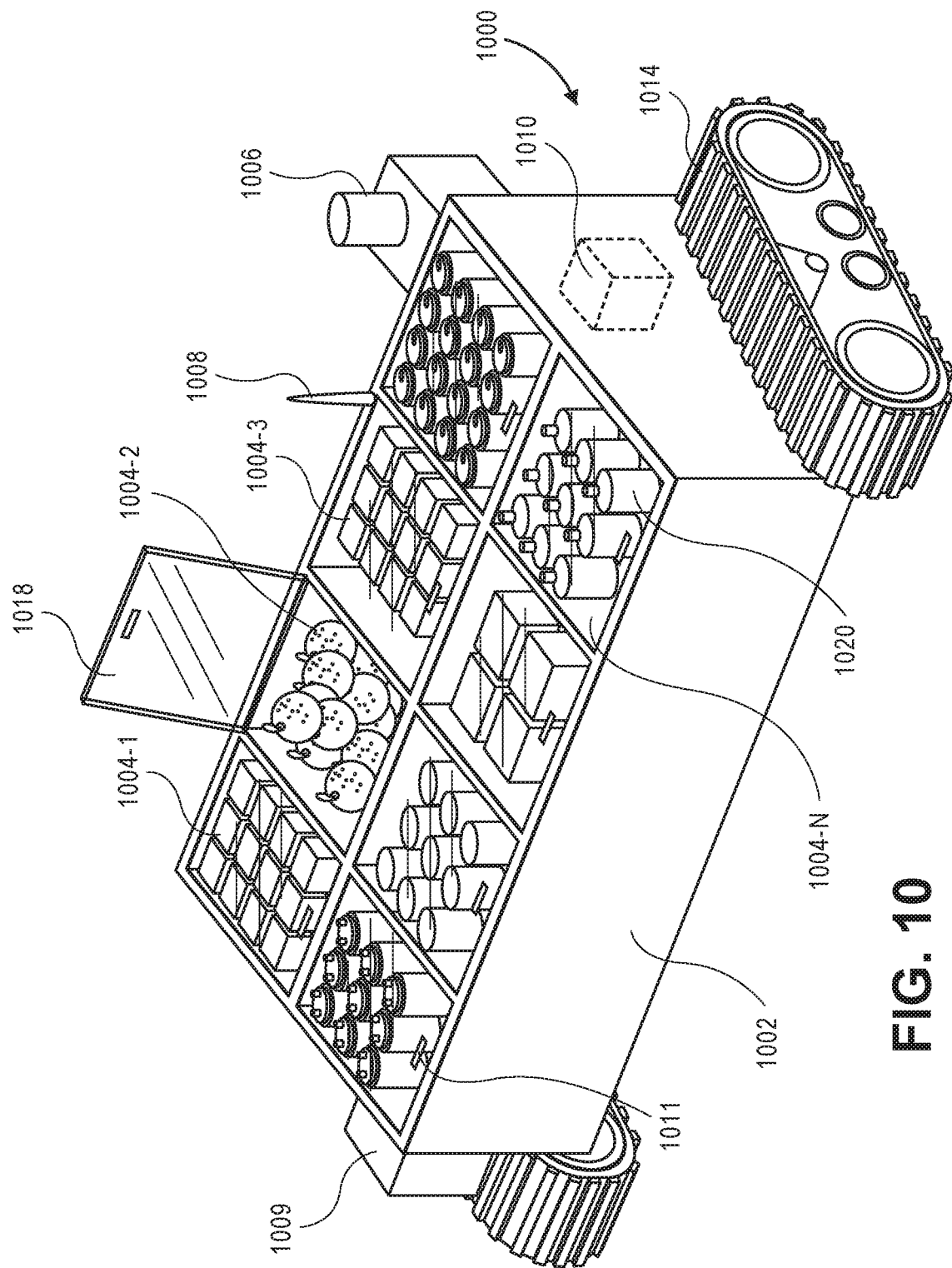
FIG. 10 is another view of a storage compartment vehicle, in accordance with disclosed implementations.

FIG. 10 is another view of an SCV 1000, in accordance with disclosed implementations. Similar to the SCVs discussed above, the SCV 1000 may include primary propulsion mechanisms 1014, and a storage compartment component 1002 having a plurality of storage compartments 1004-1, 1004-2, 1004-3-1004-N. In the illustrated implementation, the storage compartment component 1002 is configured to display to customers at the SCV 1000 items 1020 stored in the various storage compartments so that the customers may select and immediately retrieve one or more items from the SCV.

As discussed above, various techniques may be utilized by the SCV to detect and/or identify a customer at the SCV 1000. For example, the SCV may utilize the camera 1006 to obtain images of a customer that are processed and used to determine the identity of the customer. In other examples, the SCV 1000 may include a scanner 1009 or other input that the customer may interact with to provide identification to the SCV 1000. In some implementations, the SCV may include a display or other graphical user interface to facilitate customer input and identification.

In the illustrated example, the doors 1018 are substantially transparent so that customers can view items contained with the storage compartments 1004 but may remain locked until a customer is identified, to prohibit access to the items 1020. Likewise, the doors 1018 and/or other surfaces on the SCV may include item identifiers 1011 that provide information about the items contained within the storage compartments. Item information may include, but is not limited to, the identity of the item, the price of the item, the size of the item, the expiration date of the item, etc.

When a customer is identified, the doors 1018 may be unlocked so that the customer can open one or more doors and retrieve items. In some implementations, the camera 1006 may obtain images of the customer and/or the storage compartments and those images may be processed by the control system 1010 of the SCV to determine the items retrieved from the storage compartments by the customer. In other implementations, images from the camera 1006 may be transmitted by the antenna 1008 to the SCV monitoring service for processing and identification of items removed from storage compartments. In other implementations, other inputs or sensors may be used to detect item removal. For example, each storage compartment may include a pressure sensors or weight sensor that detects a change in weight at the storage compartment in response to an item being removed from the storage compartment, indicated by a decrease in weight, or an item being placed into the storage compartment, indicated by an increase in weight. In still other examples, a customer may scan an identifier of a removed item using the scanner 1009 to indicate removal of the item from a storage compartment.

In some implementations, it may be determined when a door 1018 is opened and the SCV may begin monitoring upon detection of a door open to determine if an item is removed from the storage compartment 1004 corresponding to the opened door. If an item removal is detected, the SCV may wait for a door close to be detected. If the item was not returned to the storage compartment before the door closure of the door 1018 of the storage compartment is detected, the customer may be charged for the item and the inventory of the SCV 1000 may be updated to indicate that the item has been removed from storage.

With individual storage compartments 1004 of the storage compartment component 1002, a variety of items may be maintained by the SCV and made available customers when the SCV is at a delivery location. For example, some or all of the storage compartments may be individually temperature controlled so that hot items may be contained in one storage compartment, refrigerated items in another storage compartment, and frozen items maintained in still another storage compartments. As will be appreciated, the SCV may include insulation or other protective material between and around storage compartments.

Figure 11A:
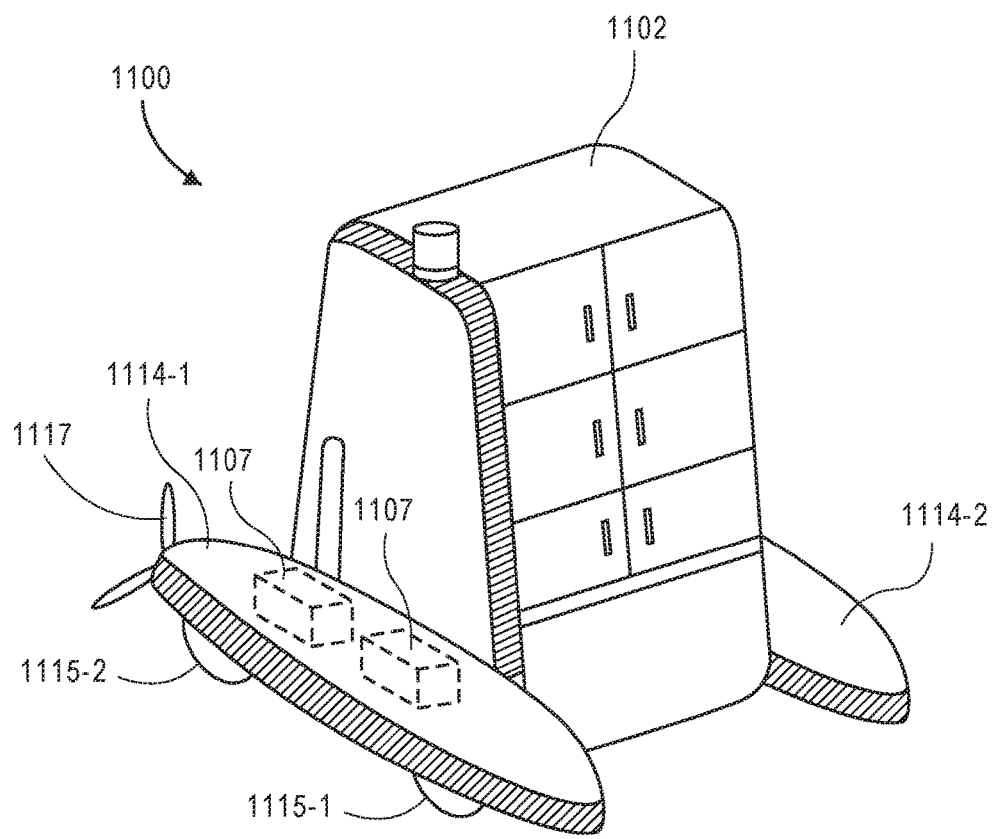
FIGS. 11A-11C are still other views of a storage compartment vehicle, in accordance with disclosed implementations.
Figure 11B:
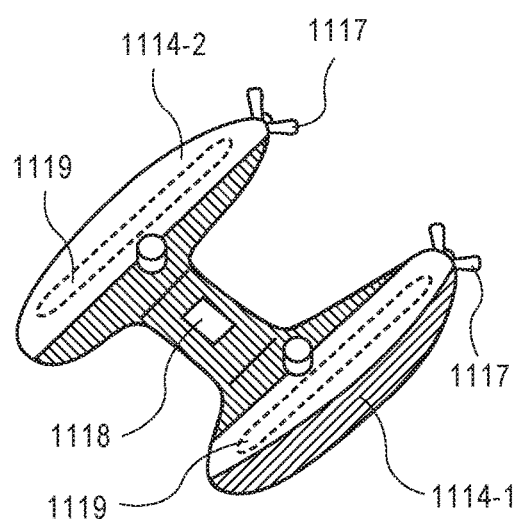
Figure 11C:
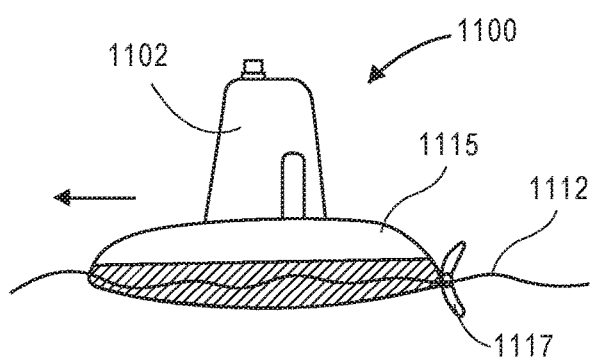

As discussed above, in some implementations, the SCVs may be modular and the storage compartment component may engage with different primary propulsion mechanisms, which may facilitate navigation across different terrains or surfaces (e.g., land, water, air). FIGS. 11A-11C illustrate views of an SCV 1100 and a primary propulsion mechanism 1114 that enables both land and water based travel by the SCV 1100, in accordance with disclosed implementations.

As illustrated in this example, the storage compartment component 1102 of the SCV is coupled to a primary propulsion mechanism 1114 that includes pontoons 1114-1 and 1114-2 or other floatation devices that are buoyant and will keep the SCV afloat when navigating across water. The primary propulsion mechanism may also include props or propellers 1117 that are operable to propel and navigate the SCV 1100 through water. In some implementations, the primary propulsion mechanism 1114 may also include wheels 1115-1, 1115-2 that may be extended, as shown, to enable ground based navigation, or retracted into the interior of the pontoons when the SCV 1100 is navigating across water. Likewise, in some implementations, the primary propulsion mechanism 1114 may include additional power supplies (e.g., batteries) 1107 that may be used to power the storage compartment component 1102, the propellers 1117, and/or other aspects of the SCV 1100.

As illustrated in FIG. 11B, the pontoons 1114-1 and 1114-2 may be coupled to form a single primary propulsion mechanism that may be engaged by the storage compartment component 1102. The single pontoon may improve the stability of the SCV when navigating along a body of water. Likewise, the primary propulsion mechanism may include an additional control 1118 that monitors the buoyancy of the SCV and may add or remove water from one or more ballasts 1119 within the pontoons to adjust the position of the SCV in the water.

Finally, FIG. 11C illustrates the SCV 1100 operating in a body of water 1112. As illustrated, the pontoons 1115 of the primary propulsion mechanism keep the SCV afloat so that the storage compartment component 1102 remains above water and the propellers 1117 propel the SCV 1100 through the water. While in this example, the storage compartment component is oriented vertically, as discussed above, the angle or orientation of the storage compartment component 1102 may be altered. For example, the storage compartment component 1102 may be rotated so that it is substantially horizontal while the SCV 1100 is operating in water, thereby lowering the center of gravity of the SCV 1100 and increasing the stability of the SCV 1100.

Figure 12A:
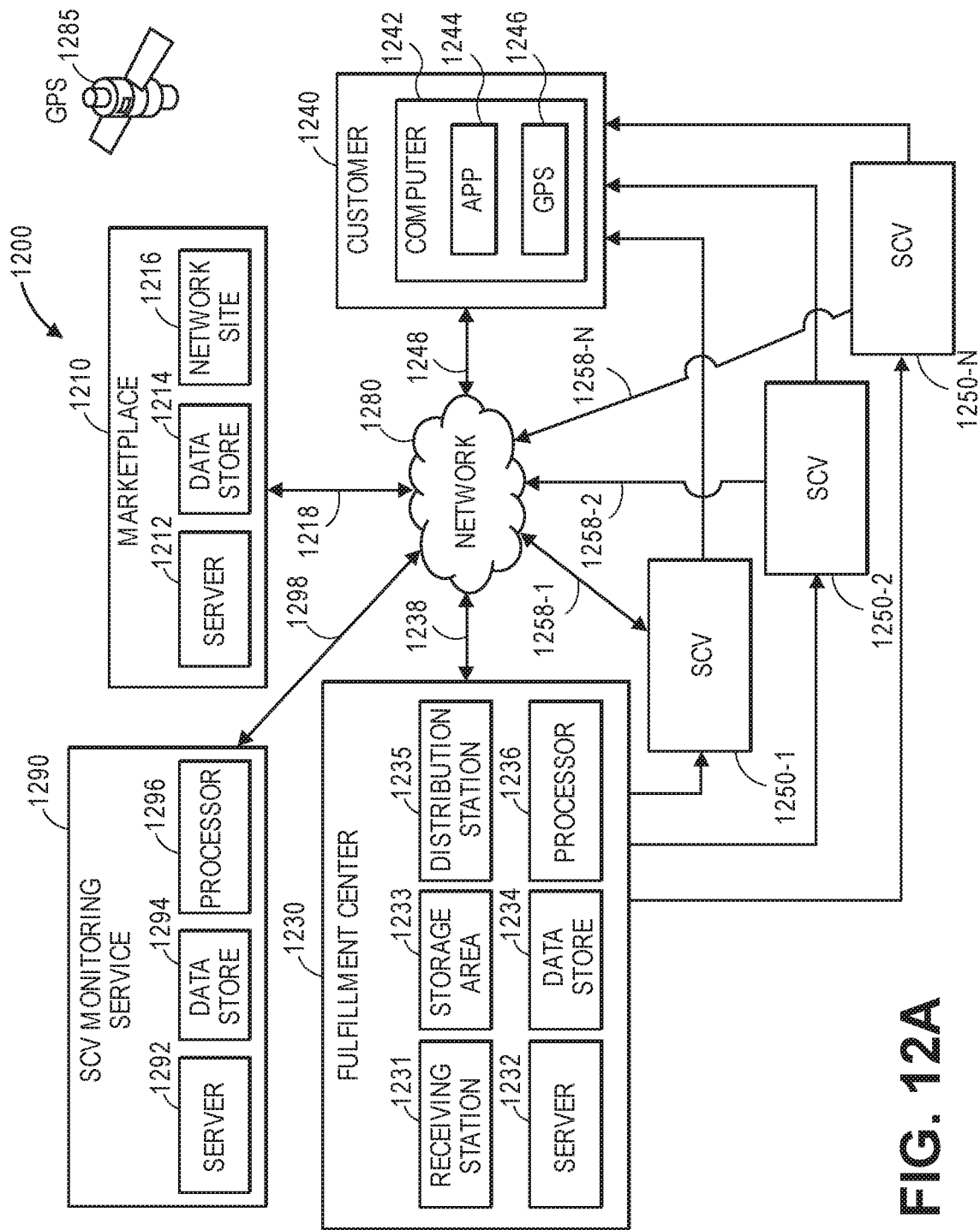
FIGS. 12A-12B are block diagrams of components of one system, in accordance with disclosed implementations.
Figure 12B:
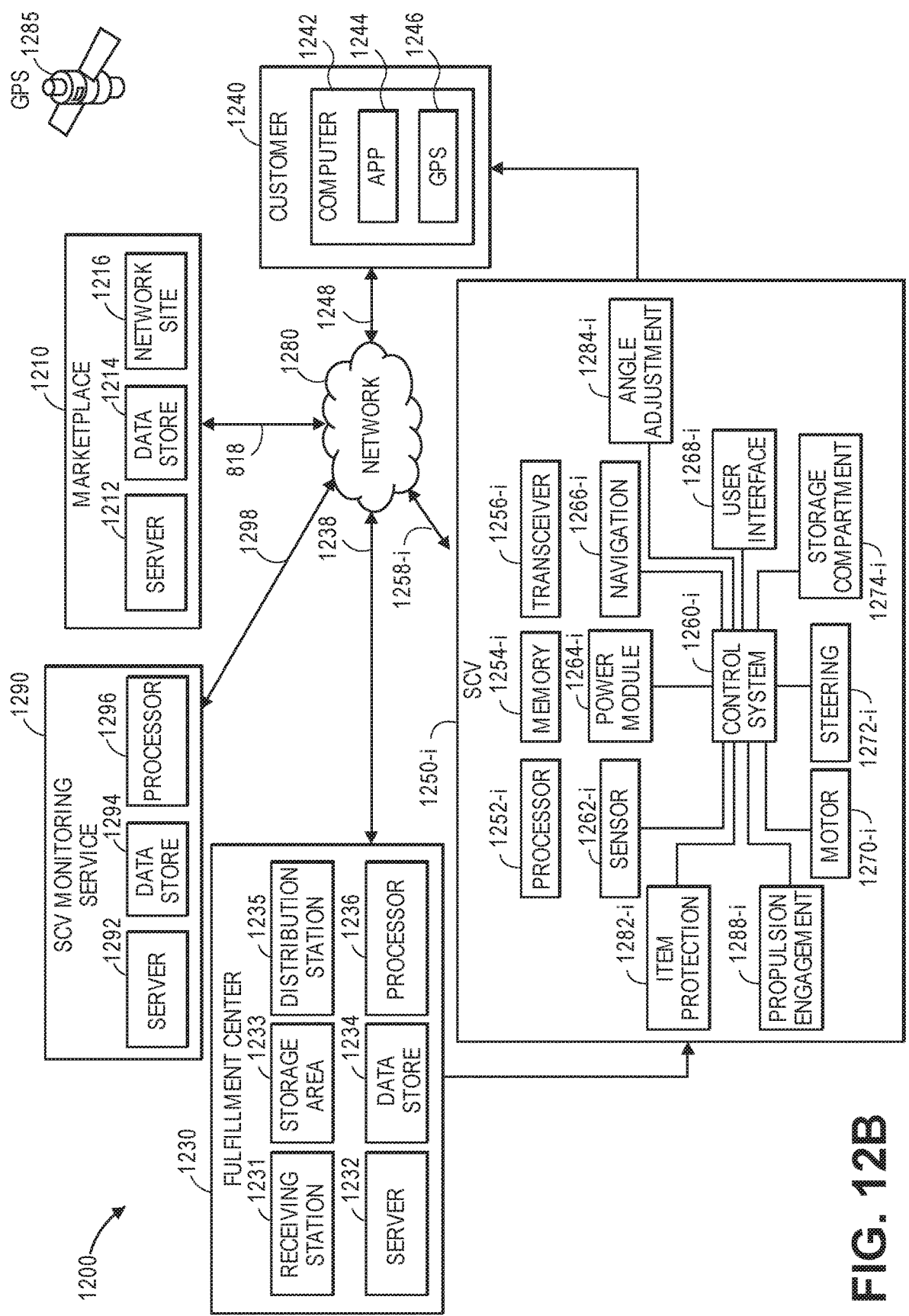

Referring to FIGS. 12A and 12B, a block diagram of components of one system 1200, in accordance with implementations of the present disclosure is shown. The system 1200 includes a marketplace 1210, a fulfillment center 1230, a customer 1240, a plurality of SCVs 1250-1, 1250-2 . . . 1250-n and an SCV monitoring service 1290 that are connected to one another across a communications network 1280, which may include the Internet in whole or in part.

The marketplace 1210 may be any entity or individual that wishes to make items from a variety of sources (e.g., vendors, manufacturers, merchants or sellers) available for download, purchase, rent, lease or borrowing by customers using a networked computer infrastructure, including one or more physical computer servers 1212 and data stores 1214 (e.g., databases) for hosting a network site 1216, such as an electronic commerce website. The marketplace 1210 may be physically or virtually associated with one or more storage or distribution facilities, such as the fulfillment center 1230. The network site 1216 may be implemented using the one or more servers 1212, which connect or otherwise communicate with the one or more data stores 1214 as well as the communications network 1280, as indicated by line 1218, through the sending and receiving of digital data. Moreover, the data store 1214 may include any type of information regarding items that have been made available for sale through the marketplace 1210, or ordered by customers, such as the customer 1240, from the marketplace 1210, or any information or data regarding the delivery of such items to the customers, e.g., by one or more of the SCVs 1250-1, 1250-2 . . . 1250-*n***.

The fulfillment center 1230 may be any facility that is adapted to receive, store, process and/or distribute items. As is shown in FIG. 12A, the fulfillment center 1230 includes a server 1232, a data store 1234, and one or more computer processors 1236. The fulfillment center 1230 also includes stations for receiving, storing and distributing items to customers, including but not limited to a receiving station 1231, a storage area 1233 and a distribution station 1235.

The server 1232 and/or the processors 1236 may operate one or more order processing and/or communication systems and/or software applications having one or more user interfaces, or communicate with one or more other computing devices or machines that may be connected to the communications network 1280, as indicated by line 1238, in order to transmit or receive information in the form of digital or analog data, or for any other purpose. For example, the server 1232 and/or the processors 1236 may also operate or provide access to one or more reporting systems for receiving or displaying information or data regarding orders for items received by the marketplace 1210, or deliveries made by one or more of the SCVs 1250-1, 1250-2 . . . 1250-*n*, and may provide one or more interfaces for receiving interactions (e.g., text, numeric entries or selections) from one or more operators, customers, workers or other persons in response to such information or data. The server 1232, the data store 1234 and/or the processor 1236 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, customers, workers or persons.

The receiving station 1231 may include any apparatuses that may be required in order to receive shipments of items at the fulfillment center 1230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as autonomous aerial vehicles), and preparing such items for storage or distribution to customers. The storage area 1233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 1235 may include one or more regions or stations where items that have been retrieved from a designated storage area may be evaluated, prepared and packed for delivery from the fulfillment center 1230 to addresses, locations or destinations specified by customers, e.g., by way of one or more of the SCVs 1250-1, 1250-2 . . . 1250-*n*, as well as carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 1231 may be processed, and the items placed into storage within the storage areas 1233 or, alternatively, transferred directly to the distribution station 1235, or "cross-docked," for prompt delivery to one or more customers.

The fulfillment center 1230 may further include one or more control systems that may generate instructions for conducting operations at one or more of the receiving station 1231, the storage area 1233 or the distribution station 1235. Such control systems may be associated with the server 1232, the data store 1234 and/or the processor 1236, or with one or more other computing devices or machines, and may communicate with the receiving station 1231, the storage area 1233 or the distribution station 1235 within the fulfillment center 1230 by any known wired or wireless means, or with the marketplace 1210, the customer 1240 or one or more of the SCVs 1250-1, 1250-2 . . . 1250-*n* over the communications network 1280, as indicated by line 1238, through the sending and receiving of digital data.

Additionally, the fulfillment center 1230 may include one or more systems or devices for determining locations of one or more elements therein, such as cameras or other image recording devices. Furthermore, the fulfillment center 1230 may also include one or more workers or staff members, who may handle or transport items within the fulfillment center 1230. Such workers may operate one or more computing devices or machines for registering the receipt, retrieval, transportation or storage of items within the fulfillment center, or a general-purpose device such as a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 1240 may be any entity or individual that wishes to download, purchase, rent, lease, borrow or otherwise obtain items (which may include goods, products, services or information of any type or form) from the marketplace 1210, e.g., for delivery by one or more of the SCVs 1250-1, 1250-2 . . . 1250-*n* to the customer or a specified delivery location for retrieval by the customer from the SCV when the SCV is at the delivery location. The customer 1240 may utilize one or more computing devices 1242 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 1244, such as a web browser or a shopping application, and may be connected to or otherwise communicate with the marketplace 1210, the fulfillment center 1230 or the SCVs 1250-1, 1250-2 . . . 1250-*n* through the communications network 1280, as indicated by line 1248, by the transmission and receipt of digital data. The computing device 1242 may also communicate with a navigation system and obtain position information, for example from the GPS receiver 1246, that is used to determine a position or location of the computing device 1242.

The SCVs 1250-1, 1250-2 . . . 1250-*n* may be any type or form of self-powered vehicle capable of being programmed or otherwise configured for autonomous travel, in furtherance of the performance of one or more tasks or operations, such as the delivery of an item from the fulfillment center 1230, a source location, to the customer 1240, a delivery location, based on one or more computer instructions. Each of the SCVs 1250-1, 1250-2 . . . 1250-*n* shown in FIG. 12A, which are represented in FIG. 12B as an SCV 1250-*i*, may include one or more computer components such as a processor 1252-*i*, a memory 1254-*i* and a transceiver 1256-*i* in communication with one or more other computer devices that may be connected to the communications network 1280, as indicated by line 1258-*i*, in order to transmit or receive information in the form of digital or analog data, or for any other purpose. For example, the SCV 1250-*i* may receive instructions or other information or data via the transceiver 1256-*i* regarding one or more items that are to be delivered from the fulfillment center 1230 to a delivery location and/or to different customers via one or more paths of a navigable path network from the marketplace server 1212, the fulfillment center server 1232 and/or the customer computing device 1242, or from any other computing device over the communications network 1280. The transceiver 1256-*i* may be configured to enable the SCV 1250-*i* to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the communications network 1280 or directly.

The transceiver 1256-*i* may further include or be in communication with one or more input/output (or "I/O") interfaces, network interfaces and/or input/output devices, and may be configured to allow information or data to be exchanged between one or more of the components of the SCV 1250-*i*, or to one or more other computer devices or systems (e.g., other SCVs) via the communications network 1280. For example, in some implementations, the transceiver 1256-*i* may be configured to coordinate I/O traffic between the processor 1252-*i* and one or more onboard or external computer devices or components. The transceiver 1256-*i* may perform any necessary protocol, timing or other data transformations in order to convert data signals from a first format suitable for use by one component into a second format suitable for use by another component. In some implementations, the transceiver 1256-*i* may include support for devices attached through various types of peripheral buses, e.g., variants of the Peripheral Component Interconnect (PCI) bus standard or the Universal Serial Bus (USB) standard. In some other implementations, functions of the transceiver 1256-*i* may be split into two or more separate components, or incorporated directly into the processor 1252-*i*.

As is also shown in FIG. 12B, the SCV 1250-*i* further includes one or more control systems 1260-*i*, as well as one or more sensors 1262-*i*, one or more power modules 1264-*i*, one or more navigation modules 1266-*i*, one or more item protection modules 1282-*i*, one or propulsion engagement modules 1288-*i*, a storage compartment component 1274-*i*, an angle or orientation adjustment modules 1284-*i*, and optionally one or more user interfaces. Additionally, the SCV 1250-*i* further includes one or more motors 1270-*i*, and one or more steering systems 1272-*i*.

The control system 1260-*i* may include one or more software applications or hardware components configured for controlling or monitoring operations of one or more components such as the sensor 1262-*i*, the power module 1264-*i*, the navigation module 1266-*i*, the item protection module 1282-*i*, the storage compartment component 1274-*i*, the angle adjustment module 1284-*i*, as well as the motors 1270-*i*, and the steering systems 1272-*i*, e.g., by receiving, generating, storing and/or transmitting one or more computer instructions to such modules. The control system 1260-*i* may communicate with the marketplace 1210, the fulfillment center 1230 and/or the customer 1240 over the communications network 1280, as indicated by line 1258-*i*, through the sending and receiving of digital data.

The sensor 1262-*i* may be a position sensor such as a GPS receiver in communication with one or more orbiting satellites or other components of a GPS system 1285, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the SCV 1250-*i*. Geolocations of the sensor 1262-*i* may be associated with the SCV 1250-*i*, where appropriate.

The sensor 1262-*i* may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the SCV 1250-*i*, or for any other purpose. For example, the sensor 1262-*i* may be configured to capture or detect reflected light if the reflected light is within a field of view of the sensor 1262-*i*, which is defined as a function of a distance between an imaging sensor and a lens within the sensor 1262-*i*, viz., a focal length, as well as a location of the sensor 1262-*i* and an angular orientation of the lens. Accordingly, where an object appears within a depth of field, or a distance within the field of view where the clarity and focus is sufficiently sharp, the sensor 1262-*i* may capture light that is reflected off objects of any kind to a sufficiently high degree of resolution using one or more sensors thereof, and store information regarding the reflected light in one or more data files.

The sensor 1262-*i* may also include manual or automatic features for modifying a field of view or orientation. For example, the sensor 1262-*i* may be a digital camera configured in a fixed position, or with a fixed focal length (e.g., fixed-focus lenses) or angular orientation. Alternatively, the sensor 1262-*i* may include one or more actuated or motorized features for adjusting a position of the sensor 1262-*i*, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 1262-*i*, or a change in one or more of the angles defining the angular orientation of the sensor 1262-*i*. For example, as discussed above, the sensor 1262-*i* may be included on a camera track and the sensor may adjust position along the track depending on the position or orientation of the storage compartment component of the SCV.

In some examples, the sensor 1262-*i* may be provided with one or more motors and/or controllers for manually or automatically operating one or more of the components, or for reorienting the axis or direction of the sensor 1262-*i*, i.e., by panning or tilting the sensor 1262-*i*. Panning the sensor 1262-*i* may cause a rotation within a horizontal plane or about a vertical axis (e.g., a yaw), while tilting the sensor 1262-*i* may cause a rotation within a vertical plane or about a horizontal axis (e.g., a pitch). Additionally, the sensor 1262-*i* may be rolled, or rotated about its axis of rotation, and within a plane that is perpendicular to the axis of rotation and substantially parallel to a field of view of the sensor 1262-*i*.

Imaging data (e.g., still or moving images, as well as associated audio data or metadata) captured using the sensor 1262-*i* may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 1262-*i* may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 1262-*i* may also be an item identification sensor, may include a bar code scanner, a radiofrequency identification (or RFID) reader, or other technology that is utilized to determine an identification of items that are being retrieved or deposited, or have been retrieved or deposited, by the SCV 1250-*i*. In some implementations, the sensor 1262-*i* may be provided within each storage component of the SCV 1250-*i*, such as a presence detection sensor and/or a motion sensor for detecting the presence or absence of one or more objects within each storage compartment, or movement of objects therein.

The sensor 1262-*i* may be further configured to capture, record and/or analyze information or data regarding its positions, velocities, accelerations or orientations of the SCV 1250-*i*, and to analyze such data or information by one or more means, e.g., by aggregating or summing such data or information to form one or more qualitative or quantitative metrics of the movement of the sensor 1262-*i*. For example, the sensor may include a gyroscope, accelerometer, compass, etc. In some examples, a net vector indicative of any and all relevant movements of the SCV 1250-*i*, including but not limited to physical positions, velocities, accelerations or orientations of the sensor 1262-*i*, may be derived. Additionally, coefficients or scalars indicative of the relative movements of the SCV 1250-*i* may also be defined.

The power module 1264-*i* may be any type of power source for providing electrical power, mechanical power, solar power, and/or other forms of power in support of one or more electrical or mechanical loads aboard the SCV 1250-*i*. In some implementations, the power module 1264-*i* may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 1264-*i* may each have any cell voltages, peak load currents, charge times, specific energies, internal resistances or cycle lives, or other power ratings. The power module 1264-*i* may also be any type, size or form of other power source, e.g., other than a battery, including but not limited to one or more fuel cells, turbines, solar cells or nuclear reactors. Alternatively, the power module 1264-*i* may be another form of prime mover (e.g., electric, gasoline-powered or any other type of motor) capable of generating sufficient mechanical forces for the SCV 1250-*i*.

The navigation module 1266-*i* may include one or more software applications or hardware components including or having access to information or data regarding aspects of a navigation path and/or a navigable path network that includes the navigation paths, including the locations, dimensions, capacities, conditions, statuses or other attributes of the various navigation paths. For example, the navigation module 1266-*i* may receive inputs from the sensor 1262-*i*, e.g., from a GPS receiver, an imaging device or another sensor, and determine an optimal direction and/or an optimal speed of the SCV 1250-*i* for travelling on a given navigation path based on such inputs. The navigation module 1266-*i* may select a navigation path to be traveled upon by the SCV 1250-*i*, and may provide information or data regarding the selected navigation path to the control system 1260-*i*.

The user interface 1268-*i*, if included, may be configured to receive and provide information to human customers of the SCV 1250-*i* and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the SCV 1250-*i* and a human customer. In various implementations, the user interface 1268-*i* may include a variety of different features. For example, in one implementation, the user interface 1268-*i* may include a relatively small display and/or a keypad for receiving inputs from human users. In other implementations, inputs for controlling the operation of the SCV 1250-*i* may be provided remotely. For example, in order to access a storage compartment, a human user may send a text message to or reply to a text message from the control system 1260-*i* and request that a door be opened in order to enable the customer to access an item located within the interior of the storage compartment. In various implementations, the SCV 1250-*i* may have capabilities for directly receiving such signals from a customer device or other device that provides a signal to open the storage compartment door.

The motor 1270-*i* may be any type or form of motor or engine (e.g., electric, gasoline-powered or any other type of motor) that is capable of providing sufficient rotational forces to one or more propulsion mechanisms or primary propulsion mechanisms of the SCV, such as axles, shafts, propellers, tracks and/or wheels for causing the SCV 1250-*i* and any items therein to travel in a desired direction, and/or at a desired speed. In some implementations, the SCV 1250-*i* may include one or more electric motors having any number of stators, poles and/or windings, such as an outrunner or an inrunner brushless direct current (DC) motor, or any other motors, having any speed rating, power rating or any other rating.

The steering system 1272-*i* may be any system for controlling a direction of travel of the SCV 1250-*i*. The steering system 1272-*i* may include any number of automatically operable gears (e.g., racks and pinions), gear boxes, shafts, shaft assemblies, joints, servos, hydraulic cylinders, linkages, electrical speed controls (ESC), and/or other features to cause the SCV 1250-*i* to travel in a desired direction.

In some implementations, the SCV 1250-*i* may be programmed or configured to perform one or more missions or tasks in an integrated manner. For example, the control system 1260-*i* may be programmed to instruct the SCV 1250-*i* to travel to a source location, e.g., the fulfillment center 1230, receive items into each storage compartment of the SCV, and proceed to one or more delivery locations so that customers can retrieve the items from the storage compartments while the SCV is positioned at different delivery locations. As the SCV navigates along a navigation path, the control system 1260-*i* may cause the motor 1270-*i* to operate at any predetermined speed and cause the steering system 1272-*i* to orient the SCV 1250-*i* in a predetermined direction or otherwise as necessary to travel along the selected navigation path, e.g., based on information or data received from or stored in the navigation module 1266-*i*. The control system 1260-*i* may further cause the sensor 1262-*i* to capture information or data (including but not limited to imaging data) regarding the SCV 1250-*i* and/or its surroundings along the selected navigation path. Likewise, the control system may send instructions to the angle adjustment controller 1284-*i* to alter the angle or orientation of the storage compartment component of the SCV as the SCV navigates along the path, based on, for example, the measured angle of the SCV and/or the slope of the terrain on which the SCV is operating. The control system 1260-*i* or one or more other components of the SCV 1250-*i* may be programmed or configured as necessary in order to execute any actions associated with a given task, in accordance with the present disclosure.

Any combination of networks or communications protocols may be utilized in accordance with the systems and methods of the present disclosure. For example, each of the SCVs 1250-1, 1250-2 . . . 1250-*n* may be configured to communicate with one another or with the marketplace server 1212, the fulfillment center server 1232 and/or the customer computer 1242 via the communications network 1280, such as is shown in FIGS. 12A and 12B, e.g., via an open or standard protocol such as Wi-Fi. Alternatively, each of the SCVs 1250-1, 1250-2 . . . 1250-*n* may be configured to communicate with one another directly outside of a centralized network, such as the communications network 1280, e.g., by a wireless protocol such as Bluetooth, in which two or more of the SCVs 1250-1, 1250-2 . . . 1250-*n* may be paired with one another.

The SCV monitoring service 1290 includes one or more physical computer servers 1292 having a plurality of databases 1294 associated therewith, as well as one or more computer processors 1296 provided for any specific or general purpose. The servers 1292 may be connected to or otherwise communicate with the databases 1294 and the processors 1296. The databases 1294 may store any type of information or data, including but not limited to acoustic signals, information or data relating to acoustic signals, or information or data regarding personnel and/or their attributes, interests or preferences, for any purpose. The servers 1292 and/or the computer processors 1296 may also connect to or otherwise communicate with the communications network 1280, as indicated by line 1298, through the sending and receiving of digital data. For example, the SCV monitoring service 1290 may include any facilities, stations or locations having the ability or capacity to receive and store information or data in one or more data stores, e.g., data files received from any of the SCVs 1250-1, 1250-2 . . . 1250-*n*, one or more other external computer systems via the communications network 1280. In some implementations, the data processing system may be provided in a physical location. In other such implementations, the data processing system may be provided in one or more alternate or virtual locations, e.g., in a "cloud"-based environment. In still other implementations, the SCV monitoring service 1290 may be provided onboard one or more of the SCVs 1250-1, 1250-2 . . . 1250-*n*.

For example, the SCV monitoring service 1290 of FIGS. 12A-12B may be independently provided for the purpose of defining a navigable path network having a plurality of delivery locations, or points, based on attributes of a given mission or task, attributes of one or more of the SCVs 1250-1, 1250-2 . . . 1250-*n*, or attributes of physical and/or geographic features within a given environment, including but not limited to locations and dimensions or other attributes of roads, sidewalks, crosswalks, bicycle or walking paths, bridges or trails, bodies of water, obstacles, or non-traditional transportation infrastructure, such as parks, fields, forests, lots, clearings or other spaces. The number and/or type of physical and/or geographic features that may be evaluated and considered for inclusion in a navigable path network by the SCV monitoring service 1290, and the number and/or type of points that may be included in such a navigable path network, are not limited.

In some implementations, the SCV monitoring service 1290 of FIG. 12B may also be provided for the purpose of receiving, tracking and/or otherwise monitoring the operations of one or more of the SCVs 1250-1, 1250-2 . . . 1250-*n*, including but not limited to any information or data regarding attributes of the SCVs 1250-1, 1250-2 . . . 1250-*n*, or missions or tasks being performed by the SCVs 1250-1, 1250-2 . . . 1250-*n*, as well as environmental conditions, traffic conditions, ground or surface conditions, weather conditions, planned or ongoing construction or other events, detected obstacles, or any other factors that may affect the capacity of one or more navigation paths.

For example, the SCV monitoring service 1290 may receive information or data regarding a mission or task to be performed, e.g., a delivery of items from a source location to a delivery location, and may identify a plurality of navigation paths between two or more of the points of a navigable path network, and may select one or more of such navigation paths as an optimal navigation path for the execution of the mission or task by one or more of the SCVs 1250-1, 1250-2 . . . 1250-*n*. The SCV monitoring service 1290 may further provide instructions to one or more of the SCVs 1250-1, 1250-2 . . . 1250-*n*, indicating a navigation path to be traveled between two or more delivery locations along the navigable path network, including times and dates at which an SCV has arrived at or departed from one or more of such delivery locations and/or times and dates the SCV is to remain at the delivery location. The SCV monitoring service 1290 may be further configured to receive information or data regarding changes to any of the attributes regarding a given mission or task, changes to any of the attributes of any of the SCVs 1250-1, 1250-2 . . . 1250-*n*, or changes to any of the attributes of the physical and/or geographic features of the environment in which the navigable path network is provided. Information or data regarding such changes may be received from any intrinsic or extrinsic sources, including but not limited to one or more networked computer systems, e.g., over the communications network 1280, or from one or more of the SCVs 1250-1, 1250-2 . . . 1250-*n*. For example, the SCV monitoring service 1290 may include information or data such as a speed, a course, a position (e.g., a latitude and a longitude), an elevation, an angle of orientation (e.g., a yaw, a pitch or a roll) of an SCV, as well as information or data regarding environmental or surface conditions, traffic conditions, congestion or any other relevant factors regarding the capacity of a given navigation path.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center," a "customer," an "SCV," a "SCV monitoring service" or like terms, may be automated steps performed by their respective computer systems, or implemented within software modules (or computer programs) executed by one or more general purpose computers. Moreover, process steps described as being performed by a "marketplace," a "fulfillment center," a "customer," an "SCV" or a "SCV monitoring service" may be performed by a human operator, but could, alternatively, be performed by an automated agent.

The marketplace 1210, the fulfillment center 1230, the customer 1240, the SCVs 1250-1, 1250-2 . . . 1250-*n* or the SCV monitoring service 1290 may use any web-enabled or Internet applications or features, or any other client-server applications or features including electronic mail (or E-mail), or other messaging techniques, to connect to the communications network 1280 or to communicate with one another, such as through short or multimedia messaging service (SMS or MMS) text messages. For example, the fulfillment center 1230 and/or the server 1232 may be adapted to transmit information or data in the form of synchronous or asynchronous messages to the marketplace 1210 and/or the server 1212, the customer 1240 and/or the computing device 1242, the SCVs 1250-1, 1250-2 . . . 1250-*n* and/or the control system 1260-*i* or the SCV monitoring service 1290, or any other computer device in real time or in near-real time, or in one or more offline processes, via the communications network 1280. Those of ordinary skill in the pertinent art would recognize that the marketplace 1210, the fulfillment center 1230, the customer 1240, the SCVs 1250-1, 1250-2 . . . 1250-*n* or the SCV monitoring service 1290 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 1212, 1232, 1292, the computing devices 1242, the processors 1252-*i*, 1296, or any other computers or control systems utilized by the marketplace 1210, the fulfillment center 1230, the customer 1240, the SCVs 1250-1, 1250-2 . . . 1250-*n*, the SCV monitoring service 1290, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Figure 13:
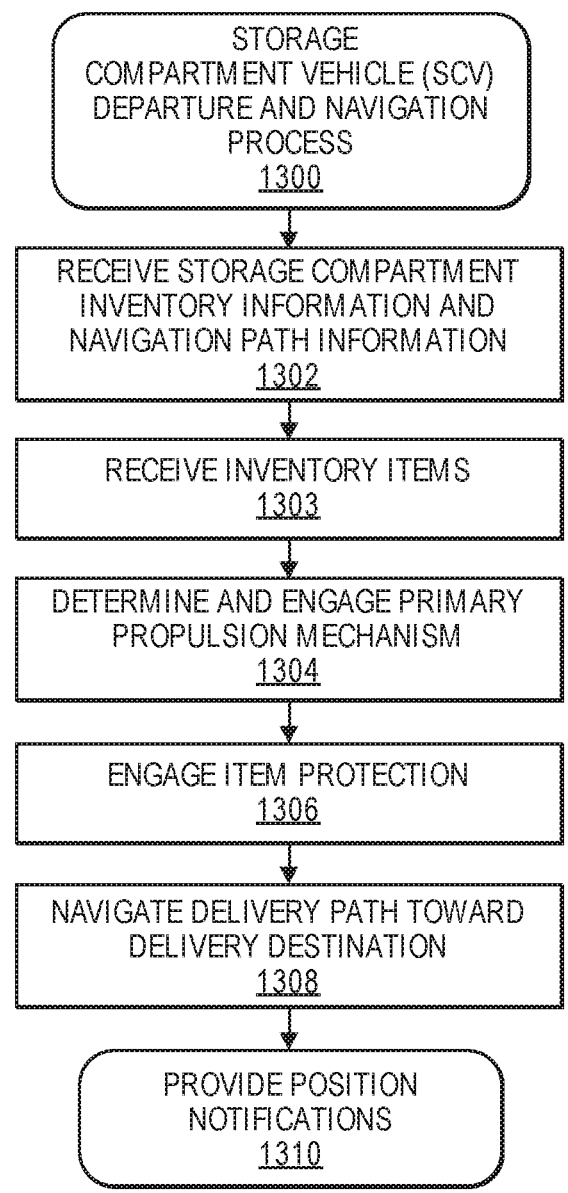
FIG. 13 is a flow diagram of an example storage compartment vehicle departure and navigation process, in accordance with disclosed implementations.

FIG. 13 is a flow diagram of an example SCV departure and navigation process 1300, in accordance with disclosed implementations. The example process 1300 begins upon receipt of storage compartment inventory information along with navigation path information, as in 1302. The storage compartment inventory information indicates items that are stored in or are to be stored in each of the storage compartments of the SCV. In some examples, the inventory information may only identify items to be stored and the SCV control system may determine which storage compartments are to be used for each item as the items are received. In other examples, the inventory information may indicate the storage compartments for each item to be received into a storage compartment by the SCV.

The navigation path information may identify the one or more delivery destinations along a navigation path that the SCV is to traverse to facilitate delivery and/or retrieval of items from the different delivery locations. As discussed above, the delivery locations may be any location that is accessible to the SCV. For example, a delivery location may be a lobby of a hotel or office building, a sidewalk corner, a customer's home, etc. In addition to the delivery locations, the navigation path information may indicate a duration of time that the SCV is to remain at each delivery location before departing and navigating to another delivery location along the navigation path.

While the SCV is still at the source location (e.g., fulfillment center), the SCV may receive each of the items that are to be stowed in various storage compartments of the SCV, as in 1303. Once the inventory items are loaded into the various storage compartments, the SCV may determine and engage primary propulsion mechanisms, if the SCV does not already have engaged primary propulsion mechanisms, as in 1304. For example, the SCV may determine based on navigation path information, preferred primary propulsion mechanisms to utilize to navigate the terrain of the navigation path. Upon determining the primary propulsion mechanisms, the SCV may navigate to a primary propulsion mechanism engagement zone and engage the primary propulsion mechanisms.

As the SCV is departing the source location, the item protection mechanism, such as the inflatable membranes within the storage compartments, may be engaged to protect the items as the SCV navigates along the navigation path, as in 1306. Finally, the SCV navigates along the navigation path toward a delivery destination, as in 1308. In some implementations, as the SCV is navigating, the SCV may provide position notifications to the SCV monitoring service and/or to customers that are to retrieve and/or return items to the SCV while the SCV is at the delivery location, as in 1310. For example, if there are four customers that are to retrieve items from storage compartments of the SCV while the SCV is at a delivery location, the SCV may provide position notifications to those customers, or devices associated with those customers, indicating the current position of the SCV and when the SCV is scheduled to arrive at the delivery location.

Figure 14:
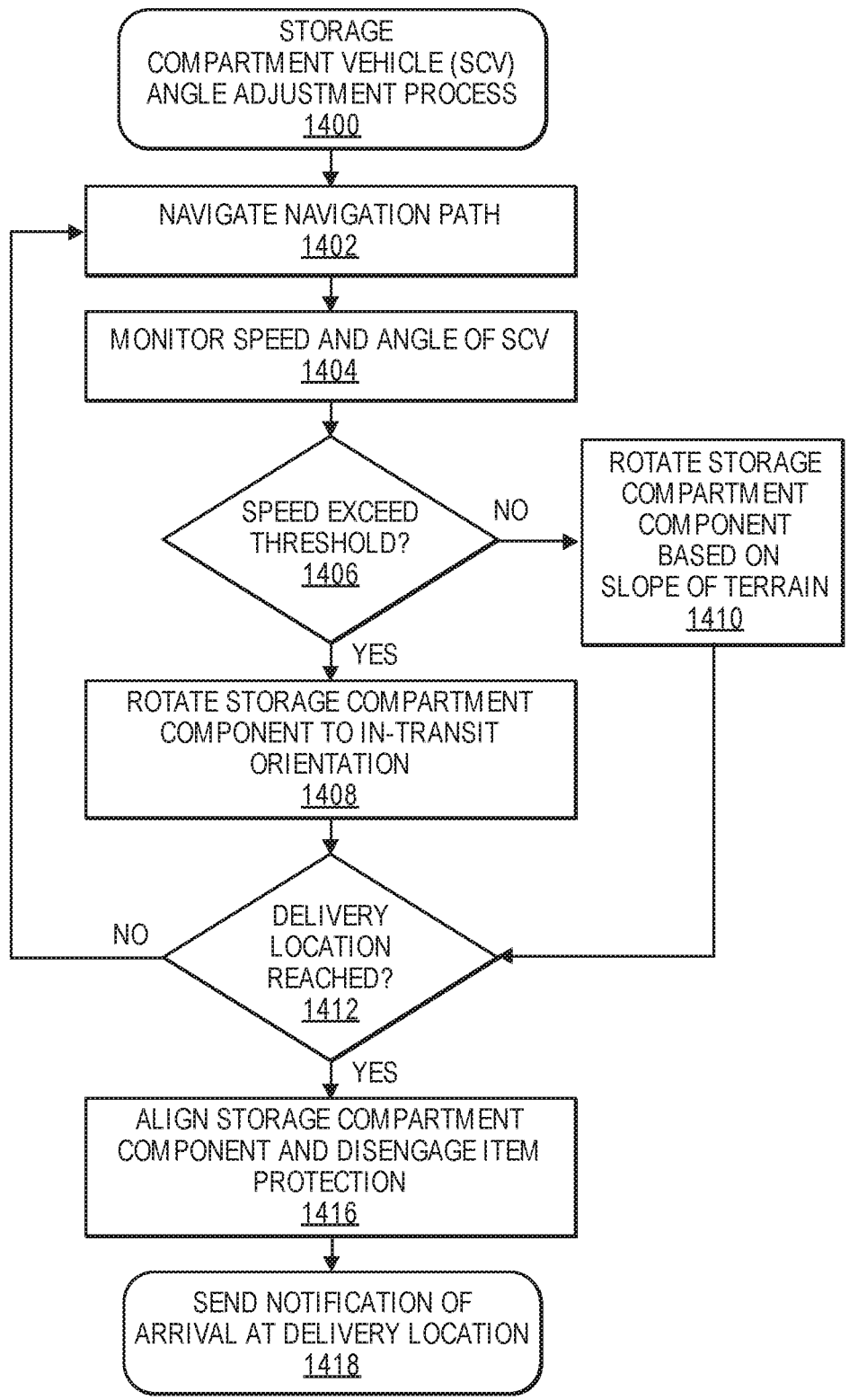
FIG. 14 is a flow diagram of an example storage compartment vehicle angle adjustment process, in accordance with disclosed implementations.

As discussed above, as the SCV navigates along a navigation path, the angle or orientation of the storage compartment component of the SCV may be adjusted based on the angle of the SCV, the slope of the terrain, the speed of the SCV, etc. FIG. 14 is a flow diagram of an example SCV angle adjustment process 1400, in accordance with disclosed implementations. The example process begins as the SCV navigates along a navigation path, as in 1402.

As the SCV navigates the navigation path, the speed and angle of the SCV are monitored, as in 1404. A determination may then be made as to whether the speed exceeds a defined threshold, as in 1406. The threshold may be any defined speed and may vary for different SCVs, different terrains, etc. If it is determined that the speed does not exceed the threshold, the angle or orientation of the storage compartment component may be adjusted based on the slope of the terrain or the measured angle of the SCV, as in 1410. For example, the angle of the storage compartment component may be adjusted such that the storage compartment component remains substantially vertical regardless of the angle of the primary propulsion mechanisms and/or the terrain on which the SCV is navigating. In other implementations, the angle of the storage compartment component may be adjusted to maintain the storage compartment component at angles other than vertical.

Returning to decision block 1406, if it is determined that the speed does exceed the threshold, the storage compartment component is rotated to an in-transit orientation such that the storage compartment component is substantially horizontal, as in 1408. The in-transit orientation may be configured to lower the center of gravity, thereby improving the stability of the SCV and/or to reduce the amount of wind drag from the storage compartment component as the SCV navigates along the path. While this example describes the in-transit position as substantially horizontal, in other implementations, the in-transit position may position the storage compartment component at an angle other than horizontal.

After rotating the storage compartment component to the in-transit position (1408) or to another angle (block 1410), a determination is made as to whether the SCV has reached the delivery location, as in 1412. If it is determined that the delivery location has not been reached, the example process 1400 returns to block 1402 and continues. If it is determined that the delivery location has been reached, the storage compartment component is aligned to a vertical position and the item protection is disengaged, as in 1416. Aligning the storage compartment component to a vertical position facilitates easy access to the storage compartments by customers.

Finally, one or more notifications may be sent by the SCV to the SCV monitoring service and/or to customers indicating that the SCV has arrived at the delivery location and is available to customers, as in 1418. As discussed herein, while the SCV is at a delivery location, customers may interact with the SCV to retrieve items, such as ordered items, from storage compartments of the SCV and/or return items by placing the items into storage compartments of the SCV.

Figure 15:
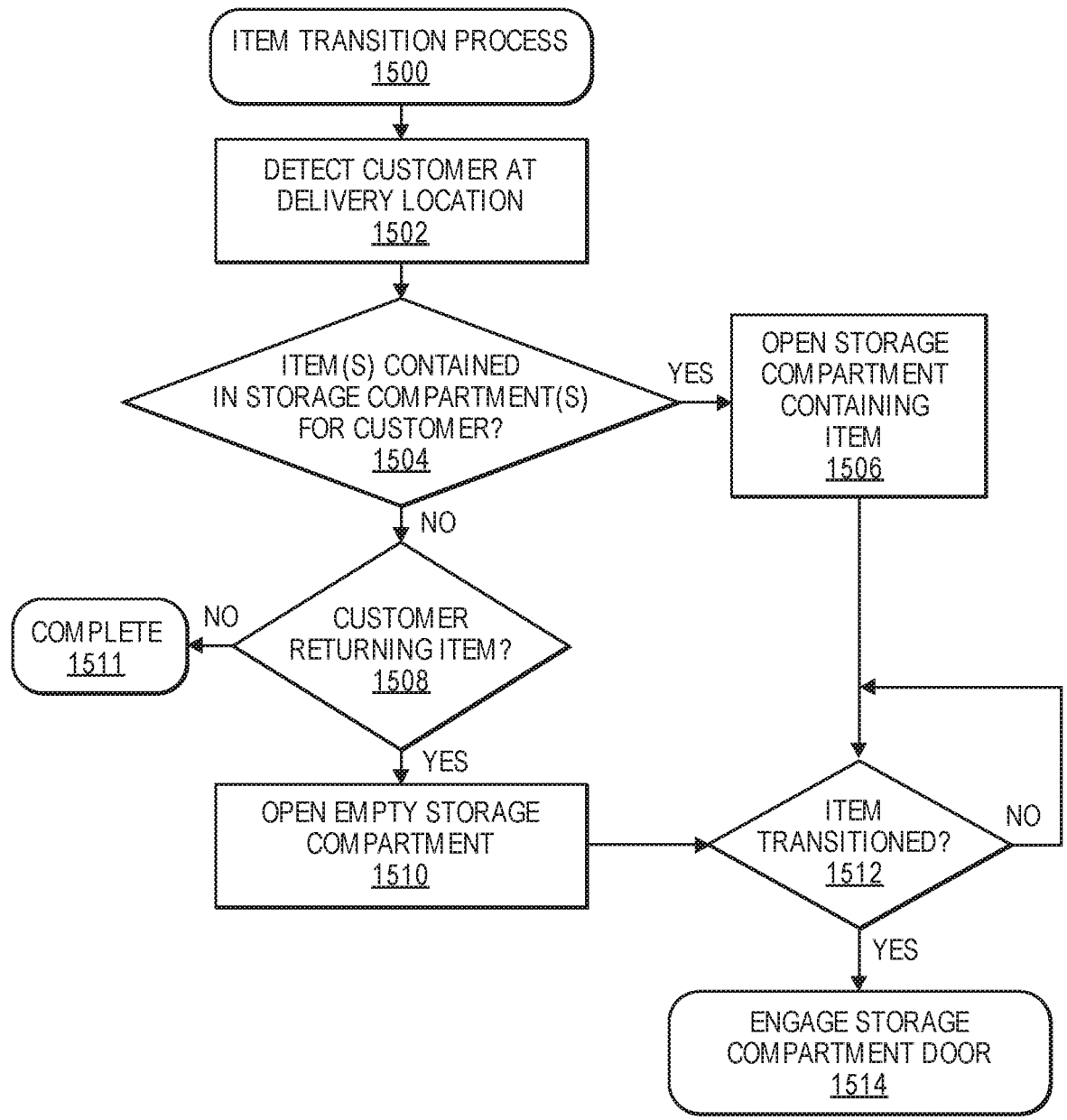
FIG. 15 is a flow diagram of an example item transition process, in accordance with disclosed implementations.

FIG. 15 is a flow diagram of an example item transition process 1500, in accordance with disclosed implementations. Item transition may be any transition of an item from a storage compartment or any transition of an item into a storage compartment.

The example process 1500 begins upon detection of a customer at an SCV when the SCV is at a delivery location and available for access by a customer, as in 1502. Customer detection may be done using a variety of techniques, as discussed above. For example, a mobile device of the customer may wirelessly communicate with the SCV to identify the customer to the SCV. in another example, images of the customer obtained by a camera of the SCV may be processed to identify the customer.

Upon customer identification, a determination is made as to whether one or more items are contained in one or more storage compartments for retrieval by the customer, as in 1504. For example, if the customer has ordered an item for retrieval from the delivery location, the item may be stored in one of the storage compartments and the storage compartment may be associated with the customer.

If it is determined that one or more storage compartments contain items to be retrieved by the customer, the one or more storage compartments containing those items are determined and the door of each of those storages compartments is disengaged to provide access by the customer to the interior of the storage compartment, as in 1506.

If it is determined at decision block 1504 that there are no items in the storage compartments to be retrieved by the customer, a determination is made as to whether the customer is returning an item that is to be placed into a storage compartment by the customer, as in 1508. For example, a customer may initiate a return of an item and specify the delivery location as the location at which the customer will transfer the item to be returned into a storage compartment of the SCV.

If it is determined that the customer is not returning an item, the example process completes, as in 1511. However, if it is determined that the customer is to return an item, an empty storage compartment is determined and the door of the storage compartment is disengaged to provide access by the customer to the interior of the storage compartment, as in 1510.

After opening the door to a storage compartment to either allow a customer to retrieve an item from the storage compartment or return an item into the storage compartment, a determination is made as to whether the item has been transitioned to or from the storage compartment, as in 1512. An item may be considered transitioned when it is removed from the storage compartment or placed into the storage compartment. In some implementations, if the customer removes an item from the storage compartment (e.g., to try it on) and returns the item to the storage compartment, the item may not be considered transitioned. As another example, if there are multiple items in a single storage compartment, only items that are removed from the storage compartment are considered transitioned. Items that are not removed from the storage compartment and/or items that are removed and then returned to the storage compartment may not be considered transitioned.

Various techniques may be used to determine if an item has been transitioned. For example, the storage compartment may include a presence detection sensor to detect the presence of absence of an item within the storage compartment. As another example, a pressure sensor may be included on the floor surface of the storage compartment to determine whether an item is present in the storage compartment. In still other examples, an imaging element (e.g., camera) may be included in the interior of the storage compartment and used to detect the presence or absence of an item in the storage compartment and/or determine an identity of an item in the storage compartment. In still another example, a tag reader, such as a Radio Frequency Identification (RFID) tag reader may be included in the storage compartment component of the SCV and capable of detecting the presence of absence of RFID tags within the interior of the storage compartments. Other techniques may likewise be utilized.

If it is determined that the item has not been transitioned, the example process remains at decision block 1512 until item transition is determined. In some implementations, if item transition is not detected after a defined period of time (e.g., five minutes), the example process may continue to block 1514.

If it is determined that item transition has occurred, or after a defined period of time, the storage compartment door is closed and the locking mechanism engaged to secure the storage compartment and prohibit access to the interior of the storage compartment, as in 1514.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 13-15, orders in which such methods or processes are presented are not intended to be construed as any limitation on the claims, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An apparatus, comprising:
   a storage compartment component including a plurality of storage compartments;
   a motor;
   a propulsion mechanism;
   a gear assembly coupled to the motor and operable to at least selectively drive the propulsion mechanism or selectively drive a primary propulsion mechanism, the gear assembly including:
   a first gear operable to selectively engage with and drive the propulsion mechanism;
   a second gear operable to selectively engage with and drive the primary propulsion mechanism when the primary propulsion mechanism is engaged with the apparatus; and
   an adapter plate that is extendable from the gear assembly and operable to engage with the primary propulsion mechanism;

one or more processors; and a memory storing program instructions that when executed by the one or more processors cause the one or more processors to at least:

cause engagement of adapter plate with the primary propulsion mechanism; and cause engagement of the second gear with the primary propulsion mechanism such that the motor can drive, via the second gear, the primary propulsion mechanism to propel the apparatus along a terrain.

2. The apparatus of claim 1, further comprising:

a membrane positioned within an interior of a storage compartment of the plurality of storage compartments, the membrane adjustable between a retracted position to enable access to the interior of the storage compartment and an expanded position that fills at least a portion of the interior of the storage compartment and encompasses at least a portion of an item positioned within the interior of the storage compartment.

3. The apparatus of claim 1, further comprising:

an orientation determining device configured to determine an orientation of the storage compartment component; and wherein the program instructions further include instructions that when executed by the one or more processors further cause the one or more processors to at least:

cause a position of the storage compartment component to be adjusted based at least in part on a determined orientation of the storage compartment component provided by the orientation determining device.

4. The apparatus of claim 1, wherein the adapter plate includes:

at least one receiver formed in the adapter plate that joins with a protrusion of the primary propulsion mechanism to couple the primary propulsion mechanism to the apparatus.

5. The apparatus of claim 1, further comprising:

an incline adjustment controller configured to adjust an angle of the storage compartment component with respect to the terrain on which the apparatus is operating, wherein the incline adjustment controller includes a gear and track assembly along which the storage compartment component is adjustable to adjust a position of the storage compartment component with respect to the terrain.

6. The apparatus of claim 1, wherein:

the propulsion mechanism includes a plurality of wheels; and the plurality of wheels are adjustable between an extended position in which the plurality of wheels engage a surface and enable propulsion of the apparatus and a retracted position.

7. The apparatus of claim 6, wherein:

the adapter plate, when in the retracted position, is between the storage compartment component and the plurality of wheels; and when the wheels are in the retracted position the adapter plate may be extended beyond the plurality of wheels to engage a primary propulsion mechanism.

8. An apparatus, comprising:

a storage compartment component including a plurality of storage compartments;

a propulsion mechanism;

an assembly operable to at least selectively drive the propulsion mechanism or a primary propulsion mechanism, the assembly including:

a first drive mechanism operable to selectively engage with and drive the propulsion mechanism;

a second drive mechanism operable to selectively engage with and drive a primary propulsion mechanism, when the primary propulsion mechanism is engaged with the apparatus; and an adapter plate that is extendable from the assembly and operable to engage with the primary propulsion mechanism;

a control system configured to at least:

send a first instruction to the assembly to engage the first drive mechanism with and drive the propulsion mechanism and cause the apparatus to navigate from a first location to a second location;

send a second instruction to the assembly to extend the adapter plate and engage a primary propulsion mechanism when the apparatus is at the second location; and send a third instruction to the assembly to engage the first drive mechanism with and drive the primary propulsion mechanism and cause the apparatus to navigate toward a delivery location.

9. The apparatus of claim 8, further comprising:

a presence detection sensor; and wherein the control system is further configured to at least:

detect, based at least in part on information received from the presence detection sensor, a presence of at least one of a customer or a device at the delivery location;

determine a storage compartment of the plurality of storage compartments associated with the customer or the device; and send a fourth instruction to cause a door of the storage compartment to open to enable access to an interior of the storage compartment.

10. The apparatus of claim 8, further comprising:

a storage compartment of the plurality of storage compartments, the storage compartment including:

an interior;

a door that is movable between a closed position that prohibits access to the interior and an open position that enables access to the interior; and a membrane positioned within the interior of the storage compartment, the membrane adjustable between a retracted position and an extended position, wherein an item is secured within the interior when the membrane is in the extended position.

11. The apparatus of claim 10, further comprising:

a plurality of sensors positioned within the interior and configured to send a signal to stop an expansion of the membrane when the item is secured within the interior.

12. The apparatus of claim 10, further comprising:

a pressure control valve coupled with the membrane to control an amount of pressure exerted by the membrane when the membrane is expanded.

13. The apparatus of claim 8, further comprising:

a camera track that extends along at least two sides of the storage compartment component; and a camera positionally coupled to the camera track and positionable along the camera track.

14. The apparatus of claim 8, wherein the control system is further configured to at least:

determine that the apparatus has arrived at the second location; and in response to a determination that the apparatus has arrived at the second location, send a fourth instruction to cause the propulsion mechanism to adjust from an extended position in which the propulsion mechanism is capable of propelling the apparatus and a retracted position.

15. The apparatus of claim 8, wherein the primary propulsion mechanism, when engaged by the adapter plate provides at least one of ground based propulsion of the apparatus, water based propulsion of the apparatus, or aerial based propulsion of the apparatus.

16. A method for transporting a plurality of items, comprising:
storing a first item in a first storage compartment of a storage compartment component of a storage compartment vehicle;
storing a second item in a second storage compartment of a storage compartment component of a storage compartment vehicle;
causing a gear assembly of the storage compartment vehicle to extend an adapter plate such that the adapter plate engages with a primary propulsion mechanism, wherein the primary propulsion mechanism may be selectively engaged or disengaged from the storage compartment vehicle; and
causing the gear assembly to drive the primary propulsion mechanism and navigate the storage compartment vehicle along a navigation path between a source location and a delivery location.

17. The method of claim 16, further comprising:
determining, during navigation, a speed of the storage compartment vehicle;
determining, based at least in part on the speed, that an angle of the storage compartment component is to be adjusted; and
causing, during navigation, the storage compartment component to adjust from a first angle to a second angle.

18. The method of claim 17, further comprising:
determining that the first angle exceeds a threshold; and wherein the second angle does not exceed the threshold.

19. The method of claim 18, wherein the second angle positions the storage compartment component substantially vertical.

20. The method of claim 16, further comprising:
determining a center of gravity of the storage compartment vehicle;
determining, based at least in part on the center of gravity, that an angle of the storage compartment component is to be adjusted; and
causing the storage compartment component to adjust from a first angle to a second angle.

* * * * *